United States Patent
David et al.

(10) Patent No.: US 9,842,024 B1
(45) Date of Patent: Dec. 12, 2017

(54) FLASH ELECTRONIC DISK WITH RAID CONTROLLER

(71) Applicant: BiTMICRO Networks, Inc., Fremont, CA (US)

(72) Inventors: Raquel Bautista David, Manila (PH); Joey Barreto Climaco, Quezon (PH)

(73) Assignee: BiTMICRO Networks, Inc., Fremont, CA (US)

( * ) Notice: Subject to any disclaimer, the term of this patent is extended or adjusted under 35 U.S.C. 154(b) by 0 days.

(21) Appl. No.: 14/217,334

(22) Filed: Mar. 17, 2014

Related U.S. Application Data

(60) Provisional application No. 61/801,111, filed on Mar. 15, 2013.

(51) Int. Cl.
| | | |
|---|---|---|
| G06F 11/10 | (2006.01) | |
| G06F 11/20 | (2006.01) | |
| G06F 3/06 | (2006.01) | |

(52) U.S. Cl.
CPC .......... *G06F 11/108* (2013.01); *G06F 3/0619* (2013.01); *G06F 3/0655* (2013.01); *G06F 3/0688* (2013.01); *G06F 11/2087* (2013.01)

(58) Field of Classification Search
CPC .................................................... G06F 3/0689
USPC ....................................................... 714/6.22
See application file for complete search history.

(56) References Cited

U.S. PATENT DOCUMENTS

| | | | |
|---|---|---|---|
| 4,402,040 A | 8/1983 | Evett | |
| 4,403,283 A | 9/1983 | Myntii et al. | |
| 4,752,871 A | 6/1988 | Sparks | |
| 4,967,344 A | 10/1990 | Scavezze et al. | |
| 5,111,058 A | 5/1992 | Martin | |
| RE34,100 E | 10/1992 | Hartness | |
| 5,222,046 A | 6/1993 | Kreifels et al. | |
| 5,297,148 A | 3/1994 | Harari et al. | |

(Continued)

FOREIGN PATENT DOCUMENTS

| | | |
|---|---|---|
| JP | 2005142859 A | 6/2005 |
| JP | 2005-309847 | 11/2005 |

(Continued)

OTHER PUBLICATIONS

Office Action for U.S. Appl. No. 13/475,878, dated Jun. 23, 2014.

(Continued)

*Primary Examiner* — Chae Ko

(57) ABSTRACT

In an embodiment of the invention, a method is presented to operationally integrate one or more RAID control mechanisms into a flash electronic disk controller. The method includes incorporating one or more RAID features into a flash electronic disk by adding one or more RAID components in a flash controller, wherein the flash electronic disk includes a RAID control module to control the one or more RAID components; receiving a read or write operation command at a flash controller from a host; translating the read or write operation command into a command format understood by one or more flash controllers; translating the command format into an instruction format understood by one or more flash memory devices; and accessing one or more memory locations in the one or more flash memory devices according to the instruction format to perform a read or write operation for the host.

26 Claims, 17 Drawing Sheets

(56) References Cited

U.S. PATENT DOCUMENTS

| | | |
|---|---|---|
| 5,339,404 A | 8/1994 | Vandling, III |
| 5,341,339 A | 8/1994 | Wells |
| 5,371,709 A | 12/1994 | Fisher et al. |
| 5,379,401 A | 1/1995 | Robinson et al. |
| 5,388,083 A | 2/1995 | Assar et al. |
| 5,396,468 A | 3/1995 | Harari et al. |
| 5,406,529 A | 4/1995 | Asano |
| 5,432,748 A | 7/1995 | Hsu et al. |
| 5,448,577 A | 9/1995 | Wells et al. |
| 5,459,850 A | 10/1995 | Clay et al. |
| 5,479,638 A | 12/1995 | Assar et al. |
| 5,485,595 A | 1/1996 | Assar et al. |
| 5,488,711 A | 1/1996 | Hewitt et al. |
| 5,500,826 A | 3/1996 | Hsu et al. |
| 5,509,134 A | 4/1996 | Fandrich et al. |
| 5,513,138 A | 4/1996 | Manabe et al. |
| 5,524,231 A | 6/1996 | Brown |
| 5,530,828 A | 6/1996 | Kaki et al. |
| 5,535,328 A | 7/1996 | Harari et al. |
| 5,535,356 A | 7/1996 | Kim et al. |
| 5,542,042 A | 7/1996 | Manson |
| 5,542,082 A | 7/1996 | Solhjell |
| 5,548,741 A | 8/1996 | Watanabe |
| 5,559,956 A | 9/1996 | Sukegawa |
| 5,568,423 A | 10/1996 | Jou et al. |
| 5,568,439 A | 10/1996 | Harari |
| 5,572,466 A | 11/1996 | Sukegawa |
| 5,594,883 A | 1/1997 | Pricer |
| 5,602,987 A | 2/1997 | Harari et al. |
| 5,603,001 A | 2/1997 | Sukegawa et al. |
| 5,606,529 A | 2/1997 | Honma et al. |
| 5,606,532 A | 2/1997 | Lambrache et al. |
| 5,619,470 A | 4/1997 | Fukumoto |
| 5,627,783 A | 5/1997 | Miyauchi |
| 5,640,349 A | 6/1997 | Kakinuma et al. |
| 5,644,784 A | 7/1997 | Peek |
| 5,682,509 A | 10/1997 | Kabenjian |
| 5,737,742 A | 4/1998 | Achiwa et al. |
| 5,787,466 A | 7/1998 | Berliner |
| 5,796,182 A | 8/1998 | Martin |
| 5,799,200 A | 8/1998 | Brant et al. |
| 5,802,554 A | 9/1998 | Caceres et al. |
| 5,819,307 A | 10/1998 | Iwamoto et al. |
| 5,822,251 A | 10/1998 | Bruce et al. |
| 5,864,653 A | 1/1999 | Tavallaei et al. |
| 5,875,351 A | 2/1999 | Riley |
| 5,881,264 A | 3/1999 | Kurosawa |
| 5,913,215 A | 6/1999 | Rubinstein et al. |
| 5,918,033 A | 6/1999 | Heeb et al. |
| 5,943,421 A | 8/1999 | Grabon |
| 5,956,743 A | 9/1999 | Bruce et al. |
| 5,987,621 A | 11/1999 | Duso |
| 6,000,006 A | 12/1999 | Bruce et al. |
| 6,014,709 A | 1/2000 | Gulick et al. |
| 6,076,137 A | 6/2000 | Asnaashari |
| 6,098,119 A | 8/2000 | Surugucchi et al. |
| 6,128,303 A | 10/2000 | Bergantino |
| 6,138,200 A | 10/2000 | Ogilvie |
| 6,138,247 A | 10/2000 | McKay et al. |
| 6,215,875 B1 | 4/2001 | Nohda |
| 6,230,269 B1 | 5/2001 | Spies et al. |
| 6,298,071 B1 | 10/2001 | Taylor et al. |
| 6,341,342 B1 | 1/2002 | Thompson et al. |
| 6,363,441 B1 | 3/2002 | Beniz et al. |
| 6,363,444 B1 | 3/2002 | Platko et al. |
| 6,397,267 B1 | 5/2002 | Chong, Jr. |
| 6,404,772 B1 | 6/2002 | Beach et al. |
| 6,496,939 B2 | 12/2002 | Portman et al. |
| 6,526,506 B1 | 2/2003 | Lewis |
| 6,529,416 B2 | 3/2003 | Bruce et al. |
| 6,557,095 B1 | 4/2003 | Henstrom |
| 6,574,142 B2 | 6/2003 | Gelke |
| 6,678,754 B1 | 1/2004 | Soulier |
| 6,728,840 B1 | 4/2004 | Shatil |
| 6,744,635 B2 | 6/2004 | Portman et al. |
| 6,785,746 B1 | 8/2004 | Mahmoud et al. |
| 6,757,845 B2 | 12/2004 | Bruce |
| 6,857,076 B1 | 2/2005 | Klein |
| 6,901,499 B2 | 5/2005 | Aasheim et al. |
| 6,922,391 B1 | 7/2005 | King et al. |
| 6,961,805 B2 | 11/2005 | Lakhani et al. |
| 6,970,446 B2 | 11/2005 | Krischar et al. |
| 6,970,890 B1 | 11/2005 | Bruce et al. |
| 6,980,795 B1 | 12/2005 | Hermann et al. |
| 7,103,684 B2 | 9/2006 | Chen et al. |
| 7,174,438 B2 | 2/2007 | Homma et al. |
| 7,194,766 B2 | 3/2007 | Noehring et al. |
| 7,263,006 B2 | 8/2007 | Aritome |
| 7,283,629 B2 | 10/2007 | Kaler et al. |
| 7,305,548 B2 | 12/2007 | Pierce et al. |
| 7,330,954 B2 | 2/2008 | Nangle |
| 7,372,962 B2 | 6/2008 | Fujimoto et al. |
| 7,386,662 B1 | 6/2008 | Kekre et al. |
| 7,412,631 B2 | 8/2008 | Uddenberg et al. |
| 7,415,549 B2 | 8/2008 | Vemula et al. |
| 7,424,553 B1 | 9/2008 | Borrelli et al. |
| 7,430,650 B1 | 9/2008 | Ross |
| 7,474,926 B1 | 1/2009 | Carr et al. |
| 7,490,177 B2 | 2/2009 | Kao |
| 7,500,063 B2 | 3/2009 | Zohar et al. |
| 7,506,098 B2 | 3/2009 | Arcedera et al. |
| 7,613,876 B2 | 11/2009 | Bruce et al. |
| 7,620,748 B1 | 11/2009 | Bruce et al. |
| 7,624,239 B2 | 11/2009 | Bennett et al. |
| 7,636,801 B1 | 12/2009 | Kekre et al. |
| 7,660,941 B2 | 2/2010 | Lee et al. |
| 7,668,925 B1 | 2/2010 | Liao et al. |
| 7,676,640 B2 | 3/2010 | Chow |
| 7,681,188 B1 | 3/2010 | Tirumalai et al. |
| 7,716,389 B1 | 5/2010 | Bruce et al. |
| 7,719,287 B2 | 5/2010 | Marks et al. |
| 7,729,730 B2 | 6/2010 | Orcine et al. |
| 7,743,202 B2 | 6/2010 | Tsai et al. |
| 7,765,359 B2 | 7/2010 | Kang et al. |
| 7,877,639 B2 | 1/2011 | Hoang |
| 7,913,073 B2 | 3/2011 | Choi |
| 7,921,237 B1 | 4/2011 | Holland et al. |
| 7,934,052 B2 | 4/2011 | Prins et al. |
| 7,958,295 B1 | 6/2011 | Liao et al. |
| 8,010,740 B2 | 10/2011 | Arcedera et al. |
| 8,032,700 B2 | 10/2011 | Bruce et al. |
| 8,156,279 B2 | 4/2012 | Tanaka et al. |
| 8,156,320 B2 | 4/2012 | Borras |
| 8,161,223 B1 | 4/2012 | Chamseddine et al. |
| 8,165,301 B1 | 4/2012 | Bruce et al. |
| 8,200,879 B1 | 6/2012 | Falik et al. |
| 8,219,719 B1 | 7/2012 | Parry et al. |
| 8,341,300 B1 | 12/2012 | Karamcheti |
| 8,341,311 B1 | 12/2012 | Szewerenko et al. |
| 8,375,257 B2 | 2/2013 | Hong et al. |
| 8,447,908 B2 | 4/2013 | Bruce et al. |
| 8,489,914 B2 | 7/2013 | Cagno |
| 8,510,631 B2 | 8/2013 | Wu et al. |
| 8,560,804 B2 | 10/2013 | Bruce et al. |
| 8,707,134 B2 | 4/2014 | Takahashi et al. |
| 8,713,417 B2 | 4/2014 | Jo |
| 8,788,725 B2 | 7/2014 | Bruce et al. |
| 8,832,371 B2 | 9/2014 | Uehara et al. |
| 8,856,392 B2 | 10/2014 | Myrah et al. |
| 8,959,307 B1 | 2/2015 | Bruce et al. |
| 9,043,669 B1 | 5/2015 | Bruce et al. |
| 9,099,187 B2 | 8/2015 | Bruce et al. |
| 9,135,190 B1 | 9/2015 | Bruce et al. |
| 9,147,500 B2 | 9/2015 | Kim et al. |
| 9,158,661 B2 | 10/2015 | Blaine et al. |
| 9,201,790 B2 | 12/2015 | Keeler |
| 9,400,617 B2 | 7/2016 | Ponce et al. |
| 2001/0010066 A1 | 7/2001 | Chin et al. |
| 2002/0011607 A1 | 1/2002 | Gelke et al. |
| 2002/0013880 A1 | 1/2002 | Gappisch et al. |
| 2002/0044486 A1 | 4/2002 | Chan et al. |
| 2002/0073324 A1 | 6/2002 | Hsu et al. |
| 2002/0083262 A1 | 6/2002 | Fukuzumi |
| 2002/0083264 A1 | 6/2002 | Coulson |

(56) References Cited

U.S. PATENT DOCUMENTS

| | | |
|---|---|---|
| 2002/0141244 A1 | 10/2002 | Bruce et al. |
| 2003/0023817 A1 | 1/2003 | Rowlands et al. |
| 2003/0065836 A1 | 4/2003 | Pecone |
| 2003/0097248 A1 | 5/2003 | Terashima et al. |
| 2003/0120864 A1 | 6/2003 | Lee et al. |
| 2003/0126451 A1 | 7/2003 | Gorobets |
| 2003/0131201 A1 | 7/2003 | Khare et al. |
| 2003/0161355 A1 | 8/2003 | Falcomato et al. |
| 2003/0163624 A1 | 8/2003 | Matsui et al. |
| 2003/0163647 A1 | 8/2003 | Cameron et al. |
| 2003/0163649 A1 | 8/2003 | Kapur et al. |
| 2003/0182576 A1 | 9/2003 | Morlang et al. |
| 2003/0204675 A1 | 10/2003 | Dover et al. |
| 2003/0223585 A1 | 12/2003 | Tardo et al. |
| 2004/0073721 A1 | 4/2004 | Goff et al. |
| 2004/0078632 A1 | 4/2004 | Infante et al. |
| 2004/0128553 A1 | 7/2004 | Buer et al. |
| 2004/0215868 A1 | 10/2004 | Solomon et al. |
| 2005/0050245 A1 | 3/2005 | Miller et al. |
| 2005/0055481 A1 | 3/2005 | Chou et al. |
| 2005/0078016 A1 | 4/2005 | Neff |
| 2005/0097368 A1 | 5/2005 | Peinado et al. |
| 2005/0120146 A1 | 6/2005 | Chen et al. |
| 2005/0210149 A1 | 9/2005 | Kimball |
| 2005/0210159 A1 | 9/2005 | Voorhees et al. |
| 2005/0226407 A1 | 10/2005 | Kasuya et al. |
| 2005/0240707 A1 | 10/2005 | Hayashi et al. |
| 2005/0243610 A1 | 11/2005 | Guha et al. |
| 2005/0289361 A1 | 12/2005 | Sutardja |
| 2006/0004957 A1* | 1/2006 | Hand, III ............ G06F 12/0866 |
| | | 711/113 |
| 2006/0026329 A1 | 2/2006 | Yu |
| 2006/0031450 A1 | 2/2006 | Unrau et al. |
| 2006/0039406 A1 | 2/2006 | Day et al. |
| 2006/0095709 A1 | 5/2006 | Achiwa |
| 2006/0112251 A1 | 5/2006 | Karr et al. |
| 2006/0129876 A1 | 6/2006 | Uemura |
| 2006/0184723 A1 | 8/2006 | Sinclair et al. |
| 2007/0019573 A1 | 1/2007 | Nishimura |
| 2007/0028040 A1 | 2/2007 | Sinclair |
| 2007/0058478 A1 | 3/2007 | Murayama |
| 2007/0073922 A1 | 3/2007 | Go et al. |
| 2007/0083680 A1 | 4/2007 | King et al. |
| 2007/0088864 A1 | 4/2007 | Foster |
| 2007/0093124 A1 | 4/2007 | Varney et al. |
| 2007/0094450 A1 | 4/2007 | VanderWiel |
| 2007/0096785 A1 | 5/2007 | Maeda |
| 2007/0121499 A1 | 5/2007 | Pal et al. |
| 2007/0130439 A1 | 6/2007 | Andersson et al. |
| 2007/0159885 A1 | 7/2007 | Gorobets |
| 2007/0168754 A1 | 7/2007 | Zohar et al. |
| 2007/0174493 A1 | 7/2007 | Irish et al. |
| 2007/0174506 A1 | 7/2007 | Tsuruta |
| 2007/0195957 A1 | 8/2007 | Arulambalam et al. |
| 2007/0288686 A1 | 12/2007 | Arcedera et al. |
| 2007/0288692 A1 | 12/2007 | Bruce et al. |
| 2007/0294572 A1 | 12/2007 | Kalwitz et al. |
| 2008/0052456 A1* | 2/2008 | Ash ...................... G06F 12/0804 |
| | | 711/113 |
| 2008/0052585 A1 | 2/2008 | LaBerge et al. |
| 2008/0072031 A1 | 3/2008 | Choi |
| 2008/0104264 A1 | 5/2008 | Duerk et al. |
| 2008/0147963 A1* | 6/2008 | Tsai ...................... G06F 3/0626 |
| | | 711/103 |
| 2008/0189466 A1 | 8/2008 | Hemmi |
| 2008/0195800 A1 | 8/2008 | Lee et al. |
| 2008/0218230 A1 | 9/2008 | Shim |
| 2008/0228959 A1* | 9/2008 | Wang .................... G06F 1/206 |
| | | 710/22 |
| 2009/0028229 A1 | 1/2009 | Cagno et al. |
| 2009/0037565 A1 | 2/2009 | Andresen et al. |
| 2009/0055573 A1 | 2/2009 | Ito |
| 2009/0077306 A1 | 3/2009 | Arcedera et al. |
| 2009/0083022 A1 | 3/2009 | Bin Mohd Nordin et al. |
| 2009/0094411 A1 | 4/2009 | Que |
| 2009/0132620 A1 | 5/2009 | Arakawa |
| 2009/0132752 A1 | 5/2009 | Poo et al. |
| 2009/0150643 A1 | 6/2009 | Jones et al. |
| 2009/0158085 A1 | 6/2009 | Kern et al. |
| 2009/0172250 A1 | 7/2009 | Allen et al. |
| 2009/0172261 A1 | 7/2009 | Prins et al. |
| 2009/0172466 A1 | 7/2009 | Royer et al. |
| 2009/0240873 A1 | 9/2009 | Yu et al. |
| 2010/0058045 A1 | 3/2010 | Borras et al. |
| 2010/0095053 A1 | 4/2010 | Bruce et al. |
| 2010/0125695 A1* | 5/2010 | Wu ........................ G06F 3/0613 |
| | | 711/103 |
| 2010/0250806 A1 | 9/2010 | Devilla et al. |
| 2010/0268904 A1 | 10/2010 | Sheffield et al. |
| 2010/0299538 A1 | 11/2010 | Miller |
| 2010/0318706 A1 | 12/2010 | Kobayashi |
| 2011/0022778 A1 | 1/2011 | Schibilla et al. |
| 2011/0022801 A1 | 1/2011 | Flynn |
| 2011/0087833 A1* | 4/2011 | Jones ................... G06F 12/0866 |
| | | 711/104 |
| 2011/0093648 A1 | 4/2011 | Belluomini et al. |
| 2011/0113186 A1 | 5/2011 | Bruce et al. |
| 2011/0145479 A1 | 6/2011 | Talagala et al. |
| 2011/0161568 A1 | 6/2011 | Bruce et al. |
| 2011/0167204 A1 | 7/2011 | Estakhri et al. |
| 2011/0173383 A1 | 7/2011 | Gorobets |
| 2011/0197011 A1 | 8/2011 | Suzuki et al. |
| 2011/0202709 A1 | 8/2011 | Rychlik |
| 2011/0208901 A1 | 8/2011 | Kim et al. |
| 2011/0208914 A1 | 8/2011 | Winokur et al. |
| 2011/0258405 A1* | 10/2011 | Asaki ..................... G06F 3/061 |
| | | 711/162 |
| 2011/0264884 A1 | 10/2011 | Kim |
| 2011/0264949 A1* | 10/2011 | Ikeuchi ................ G06F 11/1076 |
| | | 714/6.22 |
| 2011/0270979 A1 | 11/2011 | Schlansker et al. |
| 2012/0005405 A1 | 1/2012 | Wu et al. |
| 2012/0005410 A1* | 1/2012 | Ikeuchi ................ G06F 11/2087 |
| | | 711/103 |
| 2012/0017037 A1 | 1/2012 | Riddle et al. |
| 2012/0102263 A1* | 4/2012 | Aswadhati ............. G06F 13/16 |
| | | 711/103 |
| 2012/0102268 A1 | 4/2012 | Smith et al. |
| 2012/0137050 A1 | 5/2012 | Wang et al. |
| 2012/0173795 A1 | 7/2012 | Schuette et al. |
| 2012/0215973 A1 | 8/2012 | Cagno et al. |
| 2012/0249302 A1 | 10/2012 | Szu |
| 2012/0260102 A1 | 10/2012 | Zaks et al. |
| 2012/0271967 A1 | 10/2012 | Hirschman |
| 2012/0303924 A1 | 11/2012 | Ross |
| 2012/0311197 A1 | 12/2012 | Larson et al. |
| 2013/0010058 A1 | 1/2013 | Pomeroy |
| 2013/0094312 A1 | 4/2013 | Jan et al. |
| 2013/0099838 A1 | 4/2013 | Kim et al. |
| 2013/0111135 A1 | 5/2013 | Bell, Jr. et al. |
| 2013/0206837 A1 | 8/2013 | Szu |
| 2013/0208546 A1 | 8/2013 | Kim et al. |
| 2013/0212337 A1* | 8/2013 | Maruyama ............... G06F 12/00 |
| | | 711/147 |
| 2013/0212349 A1* | 8/2013 | Maruyama ............... G06F 12/00 |
| | | 711/167 |
| 2013/0212425 A1 | 8/2013 | Blaine et al. |
| 2013/0246694 A1 | 9/2013 | Bruce et al. |
| 2013/0254435 A1 | 9/2013 | Shapiro et al. |
| 2013/0262750 A1 | 10/2013 | Yamasaki et al. |
| 2013/0282933 A1 | 10/2013 | Jokinen et al. |
| 2013/0304775 A1* | 11/2013 | Davis ................... H04L 67/1097 |
| | | 707/827 |
| 2013/0339578 A1* | 12/2013 | Ohya ................... G06F 12/0246 |
| | | 711/103 |
| 2013/0339582 A1 | 12/2013 | Olbrich et al. |
| 2013/0346672 A1 | 12/2013 | Sengupta et al. |
| 2014/0068177 A1 | 3/2014 | Ramprasad |
| 2014/0095803 A1 | 4/2014 | Kim et al. |
| 2014/0104949 A1 | 4/2014 | Bruce et al. |
| 2014/0108869 A1 | 4/2014 | Brewerton et al. |
| 2014/0189203 A1* | 7/2014 | Suzuki ................. G06F 12/0246 |
| | | 711/103 |

(56) References Cited

U.S. PATENT DOCUMENTS

| | | | |
|---|---|---|---|
| 2014/0258788 A1* | 9/2014 | Maruyama | G06F 11/3452 714/47.3 |
| 2014/0285211 A1 | 9/2014 | Raffinan | |
| 2014/0331034 A1 | 11/2014 | Ponce et al. | |
| 2015/0006766 A1 | 1/2015 | Ponce et al. | |
| 2015/0012690 A1 | 1/2015 | Bruce et al. | |
| 2015/0032937 A1 | 1/2015 | Salessi | |
| 2015/0032938 A1 | 1/2015 | Salessi | |
| 2015/0067243 A1 | 3/2015 | Salessi et al. | |
| 2015/0149697 A1 | 5/2015 | Salessi et al. | |
| 2015/0149706 A1 | 5/2015 | Salessi et al. | |
| 2015/0153962 A1 | 6/2015 | Salessi et al. | |
| 2015/0169021 A1 | 6/2015 | Salessi et al. | |
| 2015/0261456 A1 | 9/2015 | Alcantara et al. | |
| 2015/0261475 A1 | 9/2015 | Alcantara et al. | |
| 2015/0261797 A1 | 9/2015 | Alcantara et al. | |
| 2015/0370670 A1 | 12/2015 | Lu | |
| 2015/0371684 A1 | 12/2015 | Mataya | |
| 2015/0378932 A1 | 12/2015 | Souri et al. | |
| 2016/0026402 A1 | 1/2016 | Alcantara et al. | |
| 2016/0027521 A1 | 1/2016 | Lu | |
| 2016/0041596 A1 | 2/2016 | Alcantara et al. | |

FOREIGN PATENT DOCUMENTS

| | | |
|---|---|---|
| TW | 489308 | 6/2002 |
| TW | 200428219 A | 12/2004 |
| TW | 436689 | 12/2005 |
| TW | I420316 | 12/2013 |
| WO | WO 94/06210 | 3/1994 |
| WO | WO 98/38568 | 9/1998 |

OTHER PUBLICATIONS

Office Action for U.S. Appl. No. 13/253,912 dated Jul. 16, 2014.
Office Action for U.S. Appl. No. 12/876,113 dated Jul. 11, 2014.
Office Action for U.S. Appl. No. 12/270,626 dated Feb. 3, 2012.
Office Action for U.S. Appl. No. 12/270,626 dated Apr. 4, 2011.
Office Action for U.S. Appl. No. 12/270,626 dated Mar. 15, 2013.
Notice of Allowance/Allowability for U.S. Appl. No. 12/270,626 dated Oct. 3, 2014.
Advisory Action for U.S. Appl. No. 12/876,113 dated Oct. 16, 2014.
Office Action for U.S. Appl. No. 14/297,628 dated Jul. 17, 2015.
Office Action for U.S. Appl. No. 13/475,878 dated Dec. 4, 2014.
USPTO Notice of Allowability & attachment(s) dated Jan. 7, 2013 for U.S. Appl. No. 12/876,247.
Office Action dated Sep. 14, 2012 for U.S. Appl. No. 12/876,247.
Office Action dated Feb. 1, 2012 for U.S. Appl. No. 12/876,247.
Notice of Allowance/Allowability dated Mar. 31, 2015 for U.S. Appl. No. 13/475,878.
Office Action dated May 22, 2015 for U.S. Appl. No. 13/253,912.
Office Action for U.S. Appl. No. 12/876,113 dated Mar. 13, 2014.
Advisory Action for U.S. Appl. No. 12/876,113 dated Sep. 6, 2013.
Office Action for U.S. Appl. No. 12/876,113 dated May 14, 2013.
Office Action for U.S. Appl. No. 12/876,113 dated Dec. 21, 2012.
Security Comes to SNMP: The New SNMPv3 Proposed Internet Standard, the Internet Protocol Journal, vol. 1, No. 3, Dec. 1998.
Notice of Allowability for U.S. Appl. No. 12/882,059 dated May 30, 2013.
Notice of Allowability for U.S. Appl. No. 12/882,059 dated Feb. 14, 2013.
Office Action for U.S. Appl. No. 12/882,059 dated May 11, 2012.
Notice of Allowability for U.S. Appl. No. 14/038,684 dated Aug. 1, 2014.
Office Action for U.S. Appl. No. 14/038,684 dated Mar. 17, 2014.
Notice of Allowance/Allowability for U.S. Appl. No. 13/890,229 dated Feb. 20, 2014.
Office Action for U.S. Appl. No. 13/890,229 dated Oct. 8, 2013.
Office Action for U.S. Appl. No. 12/876,113 dated Dec. 5, 2014.
Notice of Allowance/Allowabilty for U.S. Appl. No. 12/876,113 dated Jun. 22, 2015.
Office Action for U.S. Appl. No. 14/217,249 dated Apr. 23, 2015.
Office Action for U.S. Appl. No. 14/217,467 dated Apr. 27, 2015.
Office Action for U.S. Appl. No. 14/616,700 dated Apr. 30, 2015.
Office Action for U.S. Appl. No. 14/217,436 dated Sep. 11, 2015.
Office Action for U.S. Appl. No. 13/475,878 dated Jun. 23, 2014.
Office Action for U.S. Appl. No. 12/876,113 dated Oct. 16, 2014.
Notice of Allowance for U.S. Appl. No. 12/270,626 dated Oct. 3, 2014.
Office Action for U.S. Appl. No. 12/270,626 dated May 23, 2014.
Office Action for U.S. Appl. No. 12/270,626 dated Dec. 18, 2013.
Office Action for U.S. Appl. No. 12/270,626 dated Aug. 23, 2012.
Office Action dated Sep. 11, 2015 for U.S. Appl. No. 14/217,436.
Office Action dated Sep. 24, 2015 for U.S. Appl. No. 14/217,334.
Office Action dated Sep. 18, 2015 for Taiwanese Patent Application Office No. 102144165.
Office Action dated Sep. 29, 2015 for U.S. Appl. No. 14/217,316.
Office Action dated Sep. 28, 2015 for U.S. Appl. No. 14/689,045.
Office Action dated Dec. 5, 2014 for U.S. Appl. No. 14/038,684.
Office Action dated Oct. 8, 2015 for U.S. Appl. No. 14/217,291.
Final Office Action dated Nov. 19, 2015 for U.S. Appl. No. 14/217,249.
Final Office Action dated Nov. 18, 2015 for U.S. Appl. No. 14/217,467.
Office Action dated Nov. 25, 2015 for U.S. Appl. No. 14/217,041.
Office Action dated Oct. 5, 2015 for Taiwanese Application No. 103105076.
Office Action dated Nov. 19, 2015 for U.S. Appl. No. 14/217,249.
Office Action dated Nov. 18, 2015 for U.S. Appl. No. 14/217,467.
Office Action dated Dec. 4, 2015 for U.S. Appl. No. 14/616,700.
Office Action dated Jun. 4, 2015 for U.S. Appl. No. 14/215,414.
Office Action dated Dec. 15, 2015 for U.S. Appl. No. 13/253,912.
Office Action dated Dec. 17, 2015 for U.S. Appl. No. 14/214,216.
Office Action dated Dec. 17, 2015 for U.S. Appl. No. 14/215,414.
Office Action dated Dec. 17, 2015 for U.S. Appl. No. 14/803,107.
Office Action dated Jan. 15, 2016 for U.S. Appl. No. 14/866,946.
Office Action dated Jan. 11, 2016 for U.S. Appl. No. 14/217,399.
Office Action dated Jan. 15, 2016 for U.S. Appl. No. 14/216,937.
Notice of Allowance and Examiner-Initiated Interview Summary, dated Jan. 29, 2016 for U.S. Appl. No. 14/297,628.
Office Action for U.S. Appl. No. 14/855,245 dated Oct. 26, 2016.
Office Action for U.S. Appl. No. 14/217,249 dated Oct. 28, 2016.
Office Action for U.S. Appl.No. 14/217,399 dated Nov. 1, 2016.
Office Action for U.S. Appl. No. 14/217,291 dated Nov. 3, 2016.
Office Action for U.S. Appl. No. 15/217,947 dated Nov. 4, 2016.
Office Action for U.S. Appl. No. 14/216,627 dated Nov. 7, 2016.
Office Action for U.S. Appl. No. 14/689,019 dated Nov. 18, 2016.
Office Action for U.S. Appl. No. 14/684,399 dated Nov. 21, 2016.
Notice of Allowance for U.S. Appl. No. 14/689,045 dated Nov. 21, 2016.
Notice of Allowance for U.S. App. No. 14/217,334 dated Nov. 23, 2016.
Advisory Action for U.S. Appl. No. 14/690,305 dated Nov. 25, 2016.
Office Action for U.S. Appl. No. 14/216,937 dated Aug. 15, 2016.
Notice of Allowance for U.S. Appl. No. 14/217,096 dated Dec. 5, 2016.
Notice of Allowance for U.S. Appl. No. 14/217,161 dated Dec. 30, 2016.
Office Action for U.S. Appl. No. 14/866,946 dated Jan. 5, 2017.
Office Action for U.S. Appl. No. 14/688,209 dated Jan. 11, 2017.
Office Action for U.S. Appl. No. 14/690,243 dated Jan. 13, 2017.
Office Action for U.S. Appl. No. 15/232,801 dated Jan. 19, 2017.
National Science Fountation,Award Abstract #1548968, SBIR Phase I: SSD In-Situ Processing, http://www.nsf.gov/awardsearch/showAward?AWD_ID=1548968 printed on Feb. 13, 2016.
Design-Reuse, NxGn Data Emerges from Stealth Mode to provide a paradigm shift in enterprise storage solution, http://www.design-reuse.com/news/35111/nxgn-data-intelligent-solutions.html, printed on Feb. 13, 2016.
Office Action for U.S. Appl. No. 14/217,365 dated Feb. 18, 2016.
Office Action for U.S. Appl. No. 14/217,365 dated Mar. 2, 2016.

(56) References Cited

OTHER PUBLICATIONS

Office Action for U.S. Appl. No. 14/690,305 dated Feb. 25, 2016.
Office Action for U.S. Appl. No. 14/217,436 dated Feb. 25, 2016.
Office Action for U.S. Appl. No. 14/217,316 dated Feb. 26, 2016.
Office Action for U.S. Appl. No. 14/215,414 dated Mar. 1, 2016.
Office Action for U.S. Appl. No. 14/616,700 dated Mar. 8, 2016.
Office Action for U.S. Appl. No. 14/217,096 dated Jul. 12, 2016.
Notice of Allowance for U.S. Appl. No. 14/217,399 dated Jul. 20, 2016.
Office Action for U.S. Appl. No. 14/866,946 dated Jul. 29, 2016.
Notice of Allowance for U.S. Appl. No. 14/217,334 dated Jul. 29, 2016.
Office Action for U.S. Appl. No. 14/690,243 dated Aug. 11, 2016.
Office Action for U.S. Appl. No. 14/690,370 dated Aug. 12, 2016.
Working Draft American National Standard Project T10/1601-D Information Technology Serial Attached SCSI-1.1 (SAS-1.1), Mar. 13, 2004 Revision 4.
Office Action for U.S. Appl. No. 14/217,316 dated Aug. 25, 2016.
Office Action for U.S. Appl. No. 14/690,305 dated Aug. 26, 2016.
Advisory Action for U.S. Appl. No. 14/217,291 dated Sep. 9, 2016.
Advisory Action for U.S. Appl. No. 14/689,045 dated Sep. 16, 2016.
Notice of Allowance for U.S. Appl. No. 14/182,303 dated Sep. 12, 2016.
Advisory Action for U.S. Appl. No. 14/690,114 dated Sep. 12, 2016.
Notice of Allowance for U.S. Appl. No. 14/215,414 dated Sep. 23, 2016.
Advisory Action for U.S. Appl. No. 14/866,946 dated Oct. 13, 2016.
Office Action for U.S. Appl. No. 14/687,700 dated Sep. 26, 2016.
Office Action for U.S. Appl. No. 15/170,768 dated Oct. 6, 2016.
Notice of allowance/allowability for U.S. Appl. No. 14/217,365 dated Oct. 18, 2016.
Office Action for U.S. Appl. No. 14/616,700 dated Oct. 20, 2016.

\* cited by examiner

| Disk Number | RAID System 0 | RAID System 1 | RAID System 2 | RAID System 3 | ... | RAID System N |
|---|---|---|---|---|---|---|
| Flash Electronic Disk 0 | Master | Slave | Slave | Slave | ... | Slave |
| Flash Electronic Disk 1 | Slave | Master | Slave | Slave | ... | Slave |
| Flash Electronic Disk 2 | Slave | Slave | Master | Slave | ... | Slave |
| Flash Electronic Disk 3 | Slave | Slave | Slave | Master | ... | Slave |
| ... | ... | ... | ... | ... | ... | ... |
| Flash Electronic Disk N | Slave | Slave | Slave | Slave | ... | Master |

FIG. 16

FLASH ELECTRONIC DISK WITH RAID CONTROLLER

CROSS-REFERENCE(S) TO RELATED APPLICATIONS

This application claims the benefit of and priority to U.S. Provisional Application 61/801,111, filed 15 Mar. 2013. This U.S. Provisional Application 61/801,111 is hereby fully incorporated herein by reference.

This application relates to U.S. Utility application Ser. No. 14/217,316, "Flash Array RAID in Flash Electronic Disks" which is hereby fully incorporated herein by reference and U.S. Utility application Ser. No. 14/217,291, "Direct Memory Access Controller with RAID Hardware Assist" which is hereby fully incorporated herein by reference.

FIELD

Embodiments of the invention relate generally to computer systems and more particularly to Flash Electronic Disk with RAID Controller.

DESCRIPTION OF RELATED ART

Over the last few years, the storage systems industry has witnessed an increasing trend in shifting data storage from mechanical hard disk drives (HDD) to solid state devices (SSD), the Flash Electronic Disk being one of them. This is brought about by a number of advantages in using SSD's over HDD's, the most notable ones are increased data accessing speed, increased reliability in terms of data integrity and physical stress, and prolonged wear and tear.

The increase in data accessing speed opened up a wide range of applications that were used to be shelved because of the memory-access bottleneck. With the coming of Flash Electronic Disks, data-intensive applications now have a chance to come into reality. The absence of rotating mechanical disks in Flash Electronic Disks allowed more memory intensive applications that are physically demanding, such as military applications, shock prone environments and the like, to come into shape.

Trends in the market today point to an increasing demand for SSDs because of its fast memory access speeds. Memory intensive applications, such as database interfaces, are slowly coming into shape as the memory access bottleneck is loosened up. In the advent of memory intensive applications, it is imperative that systems should have reliable and stable data integrity measures. The most reliable data integrity system to date is the RAID system, which has been applied extensively to many computer systems using HDDs. The RAID system uses a simple architecture where data is striped or mirrored to a number of disks. All possible implementations of redundancy are already considered in its many configurations. These principles can also be applied to flash electronic disks to boost data integrity.

Conventional RAID systems prefer implementing RAID Controllers as a separate hardware entity. This is because RAID controls are computations-extensive, that when implemented in firmware, a big chunk of the CPU resource is eaten up. This invention helps to unload the firmware of a computational burden, as this invention implements RAID in hardware, but it takes it a step further. There will be no separate hardware entity for the RAID controls as it will all be integrated into the disk itself, producing a Flash Electronic Disk that is also a RAID Controller at the same time.

SUMMARY

The Flash Electronic Disks are known for its stable and reliable performance over traditional HDDs due to the absence of mechanical components. An embodiment of this invention aims to fortify the existing data integrity badge of Flash Electronic Disks by integrating RAID measures into the disk. Flash Electronic Disks in a RAID configuration would be by far, the most reliable storage system to date.

An embodiment of this invention presents a method and system for implementing RAID for Flash Electronic Disks. The invention integrates RAID control mechanisms into the Flash Electronic Disk controllers, eliminating the need for a separate RAID controller hardware, with minimal firmware intervention. The system and method uses the principles of RAID in addressing the issues brought about by physical disk crashes. The invention merges the benefits of using Flash Electronic Disks and the capabilities of RAID in data integrity, such as hot pluggable disks, into a Flash Electronic Disk. The system and method supports all RAID levels via configurable RAID controller. The system and method also provides possible RAID configurations for the disks over generic IO Interfaces.

In another embodiment of the invention, a method and system for implementing a Flash Electronic Disk with support for Redundant Array of Inexpensive Disks (RAID) system is presented. The method and system include a RAID Control Module that interprets RAID commands from any Host, an Exclusive-Or (XOR) Engine for RAID commands with parity computations, a RAID Cache for temporary storage during calculations, and possible RAID configurations for the Flash Electronic Disks via generic IO interfaces such as SATA, SCSI or PCI Express (PCIe). The invention presents a Flash Electronic Disk that is capable of executing RAID Master and Slave functions over conventional links without the need for a separate RAID Controller hardware and without extensive use of firmware processing.

A key idea of embodiments of this invention lies on having Flash Electronic Disks that offer data integrity capabilities of RAID in highly flexible configurations, without sacrificing the high memory accessing speed of Flash Electronic Disks.

BRIEF DESCRIPTION OF DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

FIG. 16 summarizes the multi-RAID configuration of multiple Flash Electronic Disks according to an embodiment of the present invention.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming but would nevertheless be a routine engineering undertaking for those of ordinary skill in the art having the benefit of this disclosure. The various embodiments disclosed herein are not intended to limit the scope and spirit of the herein disclosure.

Preferred embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

Figure 1:
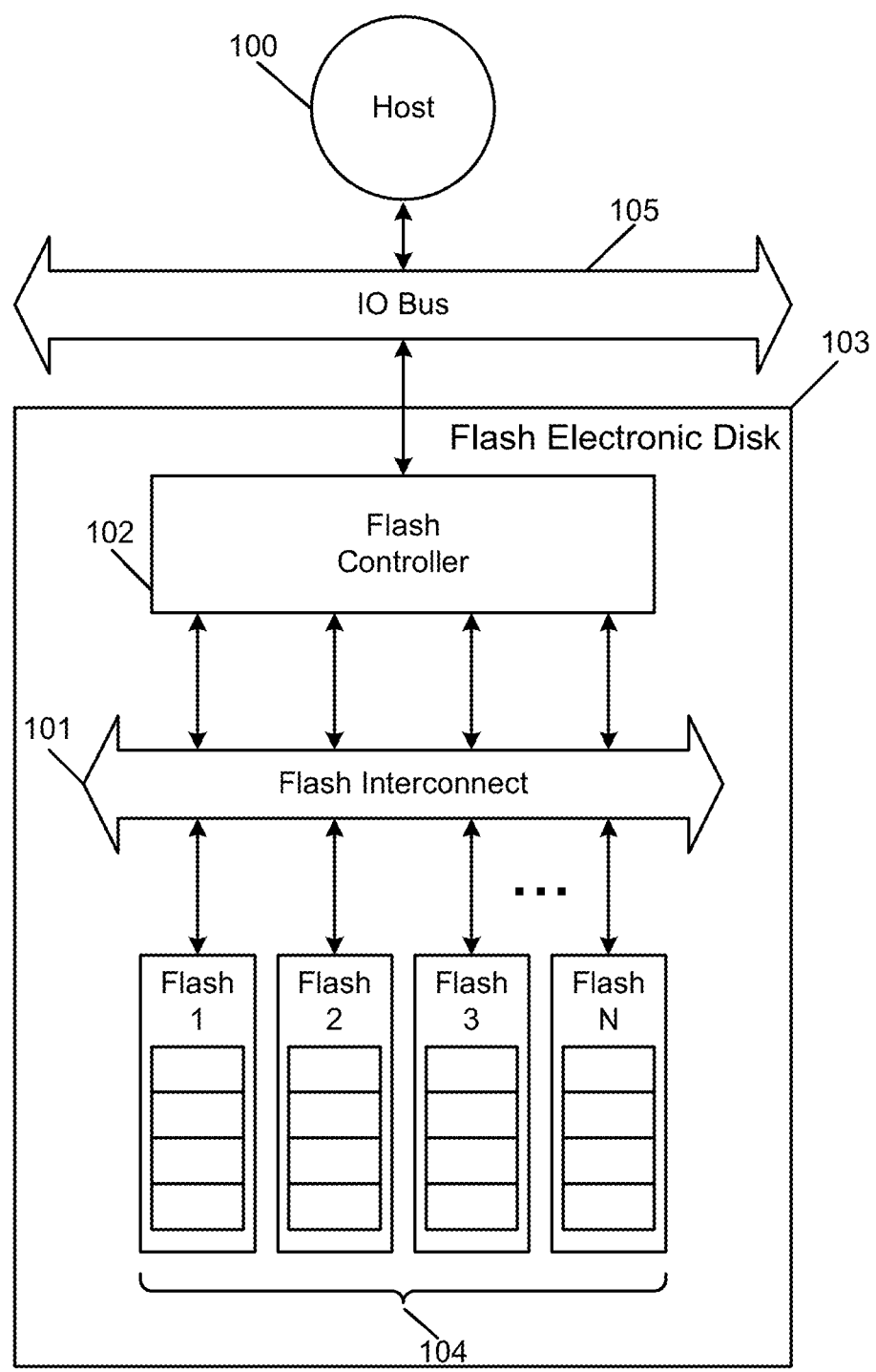
FIG. 1 shows a typical prior art Flash Electronic Disk System.

FIG. 1 shows a typical prior art Flash Electronic Disk architecture. A Flash Electronic Disk 103 is composed mainly of Flash Memory Devices 104, linked to the Flash Controller 102 by a Flash Interconnect 101. The Flash Interconnect 101 handles the necessary data passing sequences between the Host 100 and the Flash Memory Devices. The Host 100 is typically a CPU of a computer system which sends out instructions to the disk via the IO Bus 105. The Flash Electronic Disk 103 mimics an ordinary HDD so that the Host 100 sees it as an ordinary storage device. The Host issues read and write commands to the Flash Electronic Disk as if it is just accessing an ordinary HDD. The Flash Controller 102 of the Flash Electronic Disk translates the instructions from the Host 100 into flash native commands which are understood by the plurality of Flash Memory Devices 104. FIG. 1 describes a typical storage device system, though in this case, the storage device uses flash memory devices instead of the conventional rotating mechanical disks.

Figure 2:
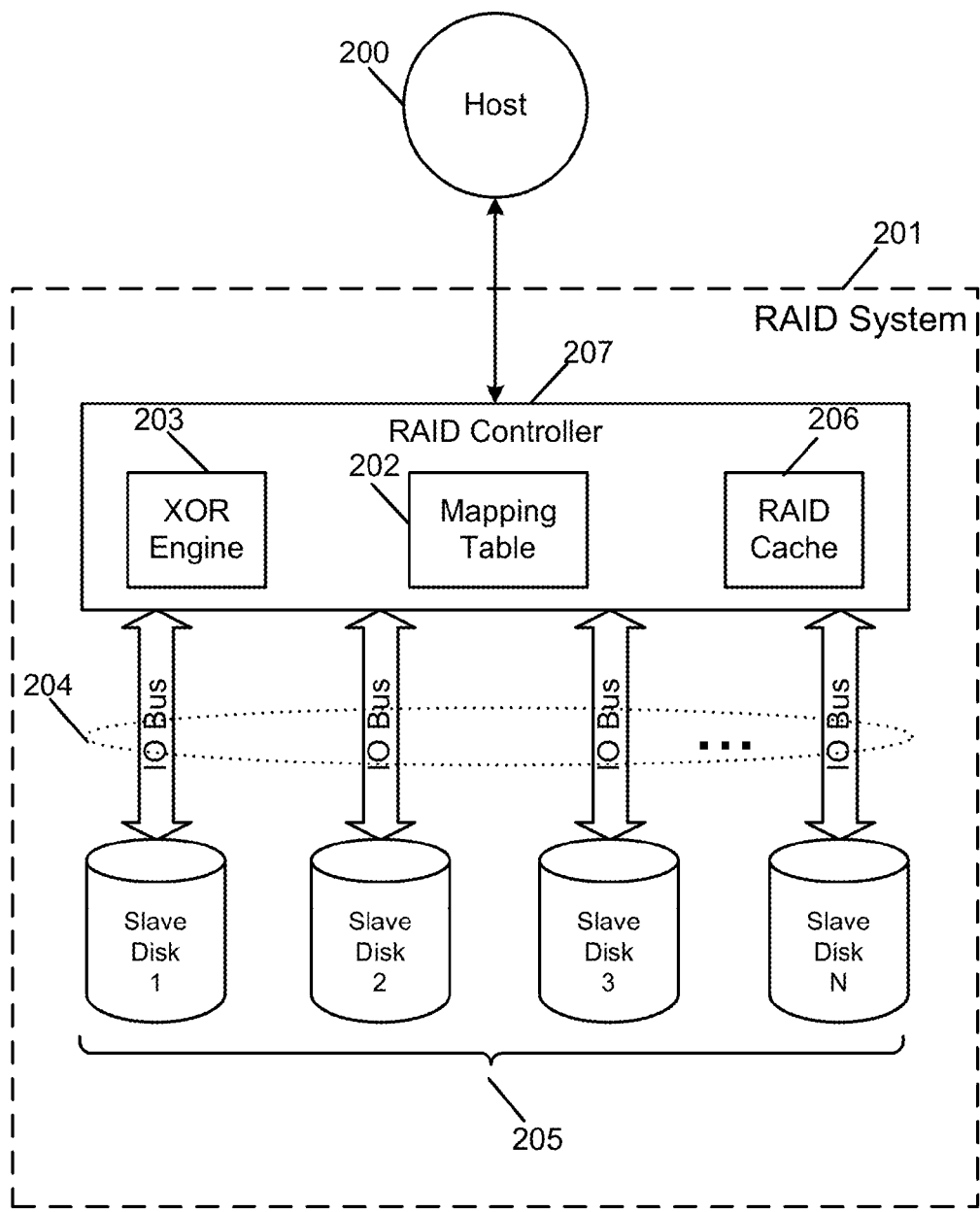
FIG. 2 shows a typical prior art RAID system and its components.

FIG. 2 illustrates a typical prior art RAID system and its components. A RAID system has a RAID Controller 207 that manages a plurality of Slave Disks 205 and makes them appear as just one storage device to the Host 200. Host 200 is usually a computer CPU that sends out memory transfer instructions to the RAID system 201. In general, the RAID Controller handles all system-related activities such as communicating to the host, accessing the slave disks, maintaining system information, executing requested transfers and recovering from disk failures. A typical RAID system distributes its data across all the slave disks in a manner commonly referred to as data striping. By allowing more than one slave disk in the system, RAID allows for concurrent access by independent processes. RAID has 5 distinct levels/configurations for redundancy; some users though combine these configurations to produce hybrids that suit their purpose. Most RAID levels employ parity for redundancy, thus requiring the use of combinational logic to implement the equivalent of an Exclusive-OR (XOR) Engine 203, which is a processing element that performs parity calculations. The RAID Cache 206 is the temporary storage of data commonly used for RAID parity operations. The Mapping Table 202 is used by the RAID Controller 207 to determine which slave disk(s) are being referred to by the request. The Mapping Table 202 is used to translate the logical block addresses specified in the commands received from the Host 200 into addresses that point to the actual physical disk locations. The Mapping Table 202 is created based on the RAID system configuration. The plurality of Slave Disks 205 and the RAID Controller 207 are linked together via IO Bus 204, which could include any of the existing IO interfaces available today, such as SCSI, SATA, PCIe, or an equivalent interface.

Figure 3:
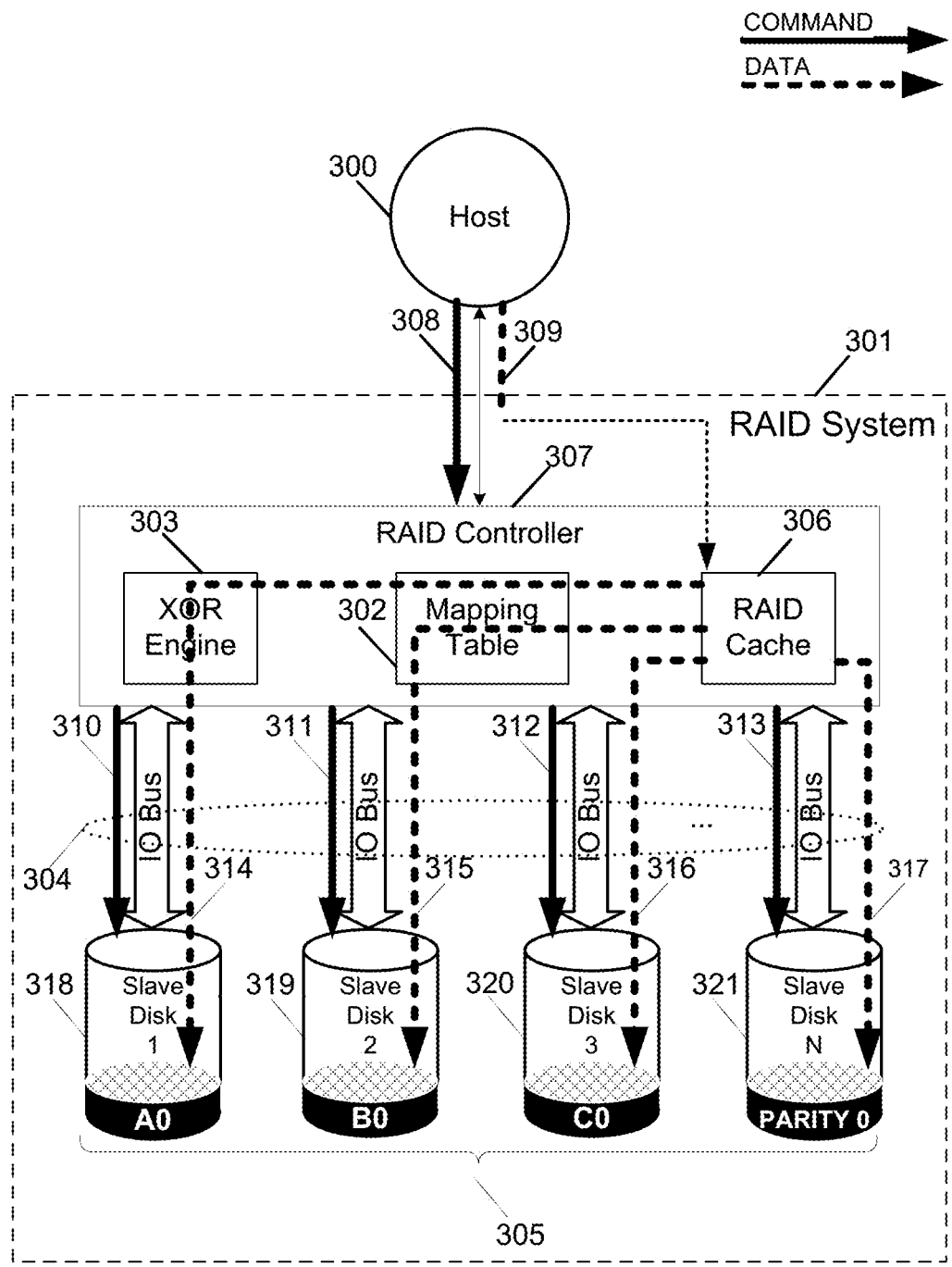
FIG. 3 illustrates a write operation implementation for a typical prior art RAID-5 system.

FIG. 3 illustrates a write operation implementation for a typical prior art RAID-5 system. RAID-5 is one of the most common protection techniques against failed disks. This RAID configuration works by striping data and parity information across all the slave disks. In FIG. 3, Host 300 issues a write command 308 to the RAID Controller 307. The write data 309 is stored in the RAID Cache 306. The RAID Controller after referring to its Mapping Table 302 determines that the write data in the RAID Cache 306 should be striped across the plurality of slave disks 305. The RAID Controller issues an IO write command 310 to write data stripe 0 314 to Slave Disk 1 318, an IO write command 311 to write data stripe 1 315 to Slave Disk 2 319 and an IO write command 312 to write data stripe 2 316 to Slave Disk 3 320. The RAID Controller also generates the corresponding parity stripe 317 by XORing the data stripes. This parity stripe is written by the RAID Controller to Slave Disk N 321 by issuing another IO write command 313.

Figure 4:
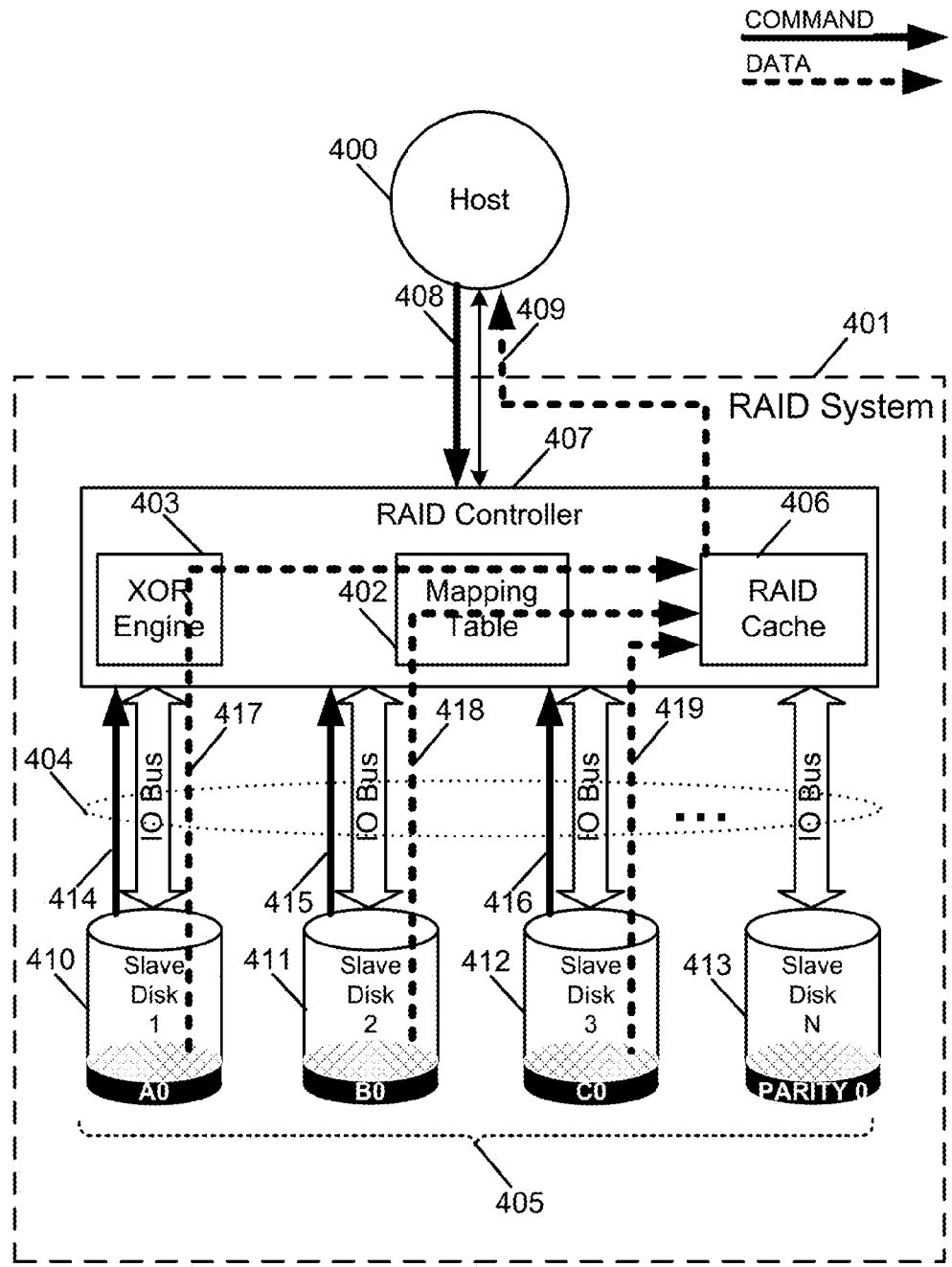
FIG. 4 illustrates a read operation implementation for a typical prior art RAID-5 system.

FIG. 4 illustrates a read operation implementation for a typical prior art RAID-5 system. Host 400 issues a read command 408 to the RAID Controller 407. The RAID Controller checks its Mapping Table 402 to determine from which slave disks 405 the data will come from. The RAID controller then issues an IO read command 414 to Slave Disk 1 410 to get data stripe 417, an IO read command 415 to Slave Disk 2 411 to get data stripe 418 and an IO read command 416 to Slave Disk 3 412 to get data stripe 419. These data stripes are stored and reconstructed in RAID Cache 406 before being sent to the Host 400 as the read data 409. In some cases, parity checking is performed during read operation in which case the parity stripe is read from the other disk and then XORed to all the data stripes read from the rest of the slave disks.

Figure 5:
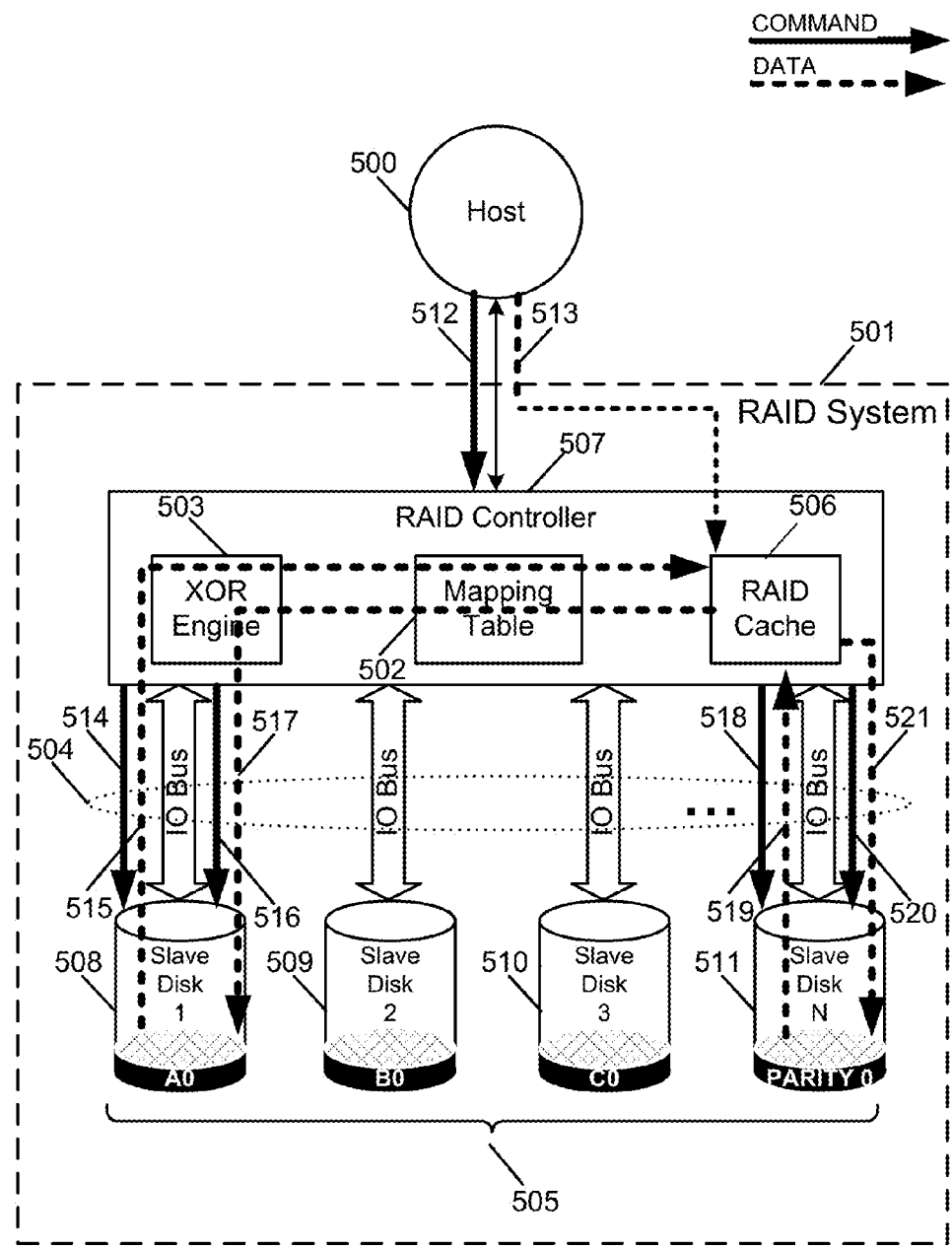
FIG. 5 illustrates a read-modify-write operation implementation for a typical prior art RAID-5 system.

FIG. 5 illustrates a read-modify-write operation implementation for a typical prior art RAID-5 system. Read-modify-write occurs whenever the Host requests to write only a data stripe instead of the whole data block. Host 500 sends a write command 512 to the RAID Controller 507. The RAID Controller receives the write data 513 and stores it in the RAID Cache 506. After referring to the Mapping Table 502, the RAID Controller discovers that the write request involves a write of only a data stripe. The RAID Controller then issues an IO read command 514 to the Slave Disk 1 508 to read the old data stripe 515. The old data stripe 515 is XORed with the new data stripe stored in the RAID Cache 506 using the XOR Engine 503. The result of the XOR operation is temporarily stored in the RAID Cache 506. The new data stripe is still kept in the RAID Cache. The RAID Controller then issues an IO read command 518 to the Slave Disk N 511 to read the old parity 519. The old parity 519 is then XORed with the result of the previous XOR operation using the XOR Engine 503. The result of this XOR operation, the new parity, is again stored in the RAID Cache 506. After generating the new parity, the RAID Controller 507 issues an IO write command 516 to the Slave Disk 1 508 to write the new data stripe 517 from the RAID Cache 506. The RAID Controller also issues an IO write command 520 to the Slave Disk N 511 to write the new parity 521 from the RAID Cache 506. This completes the read-modify-write operation.

Figure 6:
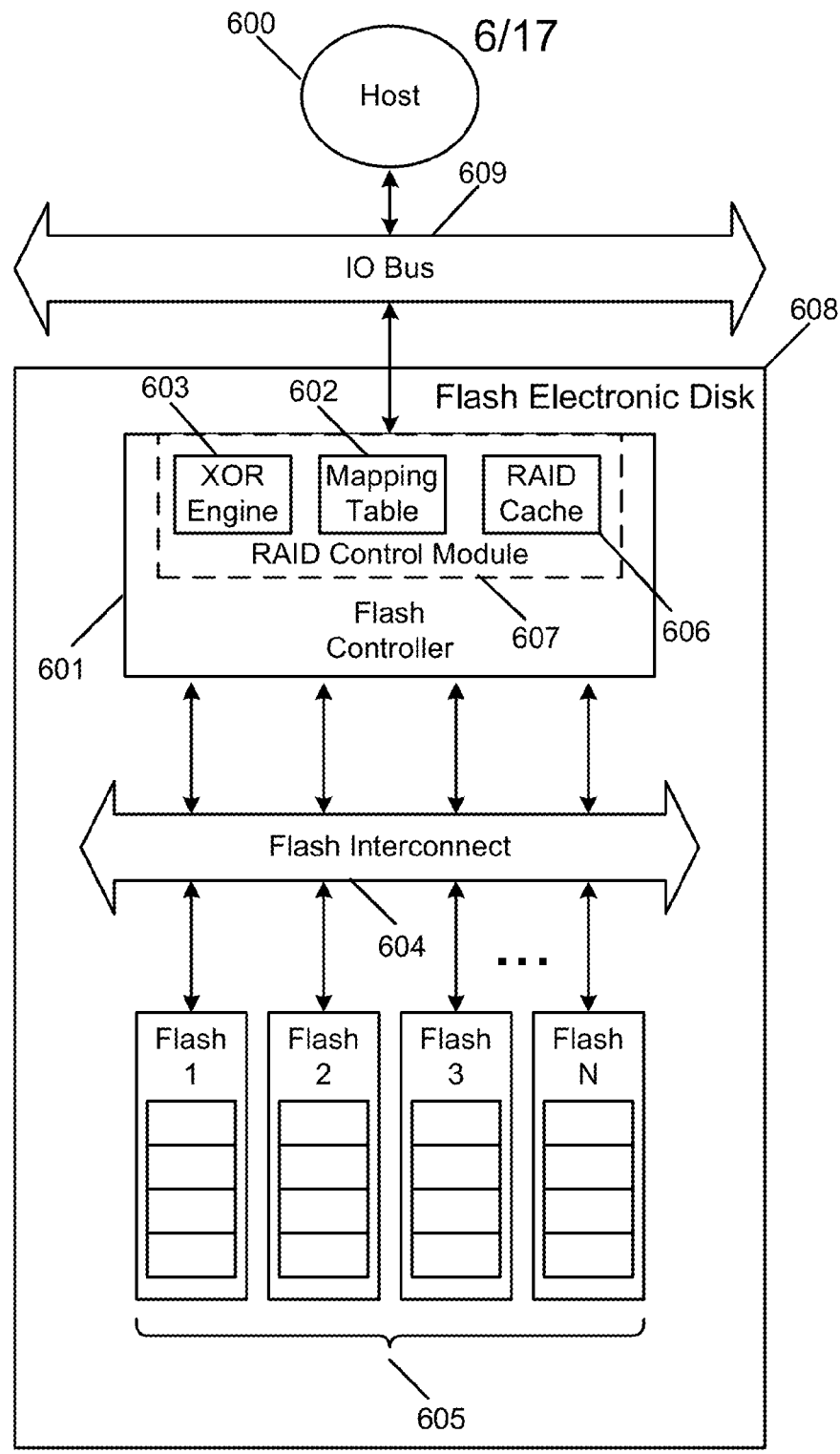
FIG. 6 illustrates the modified Flash Electronic Disk Architecture according to an embodiment of the present invention.

FIG. 6 illustrates the modified Flash Electronic Disk Architecture. In this invention, the RAID features are incorporated into the Flash Electronic Disk by adding the RAID components in the Flash Controller. The Flash Electronic Disk 608 is upgraded with the addition of the RAID Control Module 607, which handles the RAID capabilities of the invention. The RAID Control Module contains an XOR Engine 603 that is used during parity calculations, a RAID Cache 606 that serves as the temporary data storage during parity calculations and a Mapping Table 602 for address translation of the commands received from the Host 600.

In a computer system where RAID is needed, the Flash Electronic Disk in FIG. 6 becomes a ready RAID Controller eliminating the need for a separate hardware entity. The plurality of Flash Memory Devices 605 serves as the non-volatile cache of the RAID system. The Flash Memory Devices are used to store recently used information for the RAID system. The Flash Controller 601 partitions the Flash Memory Devices 605 into stripes and records the boundaries. The Flash Controller passes these boundaries to the RAID Control Module 607 for inter-disk striping of RAID. The use of these flash memory devices as cache significantly enhances the performance of the RAID system because they reduce frequent access to slower storage devices such as HDD.

The Flash Electronic Disk of FIG. 6 is also capable of handling master and slave roles in a RAID system. The plurality of Flash Memory Devices 605 may be used as a slave disk instead of a cache. The memory locations of the Flash Memory Devices are remapped on a new addressing scheme kept by the RAID Control Module 607 in its Mapping Table 602. In addition, it is possible to distribute the flash memory devices to a number of RAID systems. The Flash Electronic Disk can have one flash memory device assigned to its RAID Control Module 607, and the rest of its Flash Memory Devices 605 assigned to different RAID controllers in other RAID systems. This way, the Flash Electronic Disk 608 can participate in multiple RAID systems rather just one, and can also take dual roles depending on which RAID system it is in.

Furthermore, the plurality of Flash Memory Devices 605 can be configured as replacement disks or "hot spares". The availability of replacement disks allows the RAID Control Module 607 to perform reconstruction. Reconstruction is a background process executed in the RAID system to regenerate the data from the failed disk. This process involves reading the data from the surviving slave disks for each stripe, calculating the parity of that data and then writing this value to the replacement disk. Reconstruction works both for data and parity disks since the XOR operation is commutative. The performance of the RAID system is degraded while a failed disk is being rebuilt. However, the RAID system continues to function in such a way that all data are still accessible by the Host including that from the failed disk.

Figure 7:
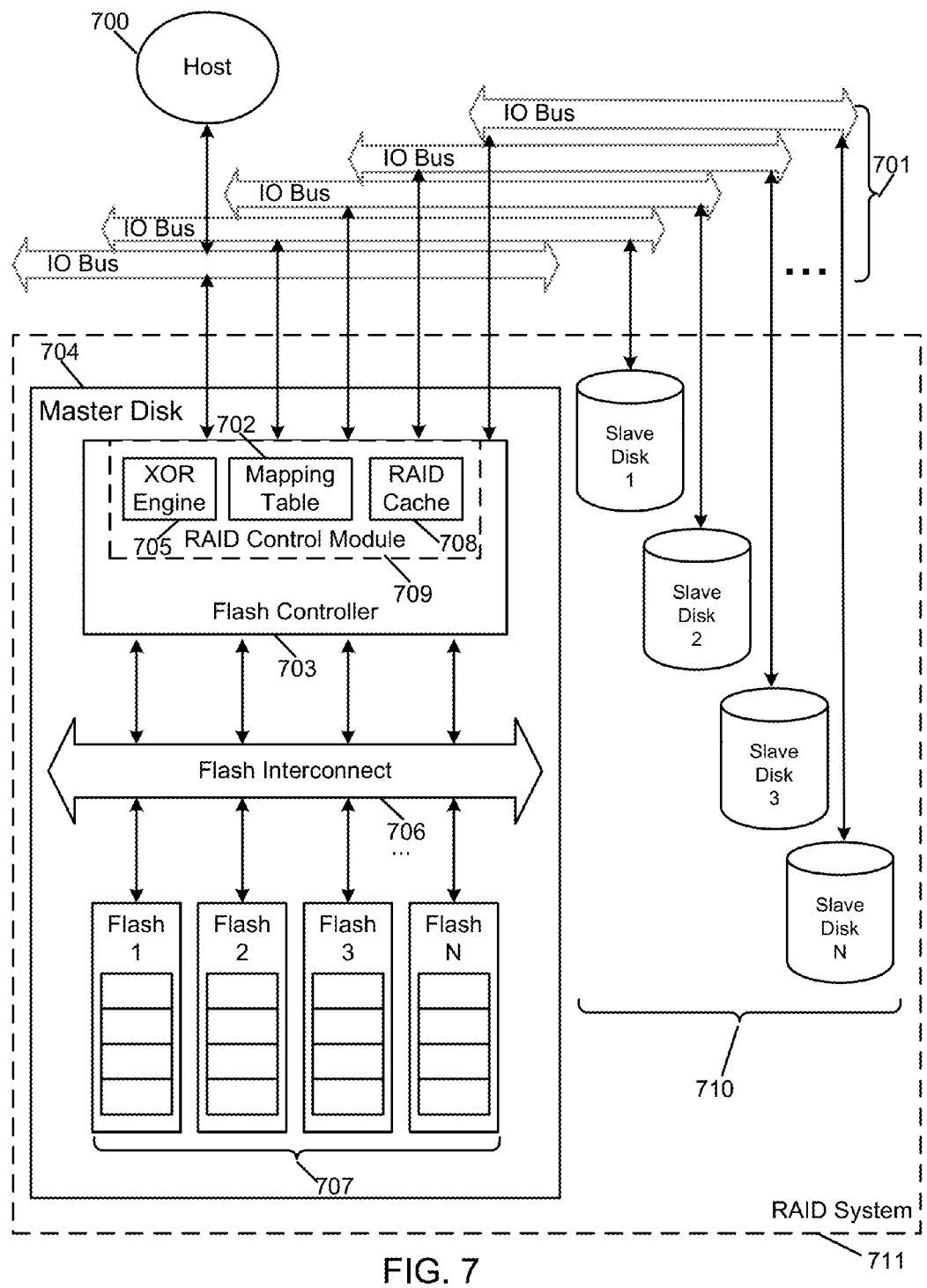
FIG. 7 shows a RAID system consisting of ordinary disks and the Flash Electronic Disk according to an embodiment of the present invention.

FIG. 7 shows a RAID system consisting of ordinary disks and the Flash Electronic Disk according to an embodiment of the present invention. The Flash Electronic Disk is labeled as the "Master Disk" 704 to differentiate it from the Slave Disks 710 in the RAID system 711. The RAID Control Module 709 of the Master Disk 704 is configured to be the RAID Controller of the RAID system 711. The Master Disk 704 comprising of a Flash Controller 703 along with the Flash Interconnect 706 and the plurality of Flash Memory Devices 707, used as the system cache, communicates with the Slave Disks 710 through the one or more generic IO Bus 701, such as SCSI, SATA, PCIe, or an equivalent IO Bus. The slave disks of the RAID system 711 may be any other disk, HDD or SSD, as long as it can interface with the one or more IO Bus 701. The RAID Control Module 709 has its own XOR Engine 705 for parity calculations, a RAID Cache 708 for temporary storage of data and a Mapping Table 702 for translating the commands received for the RAID system.

Figure 8:
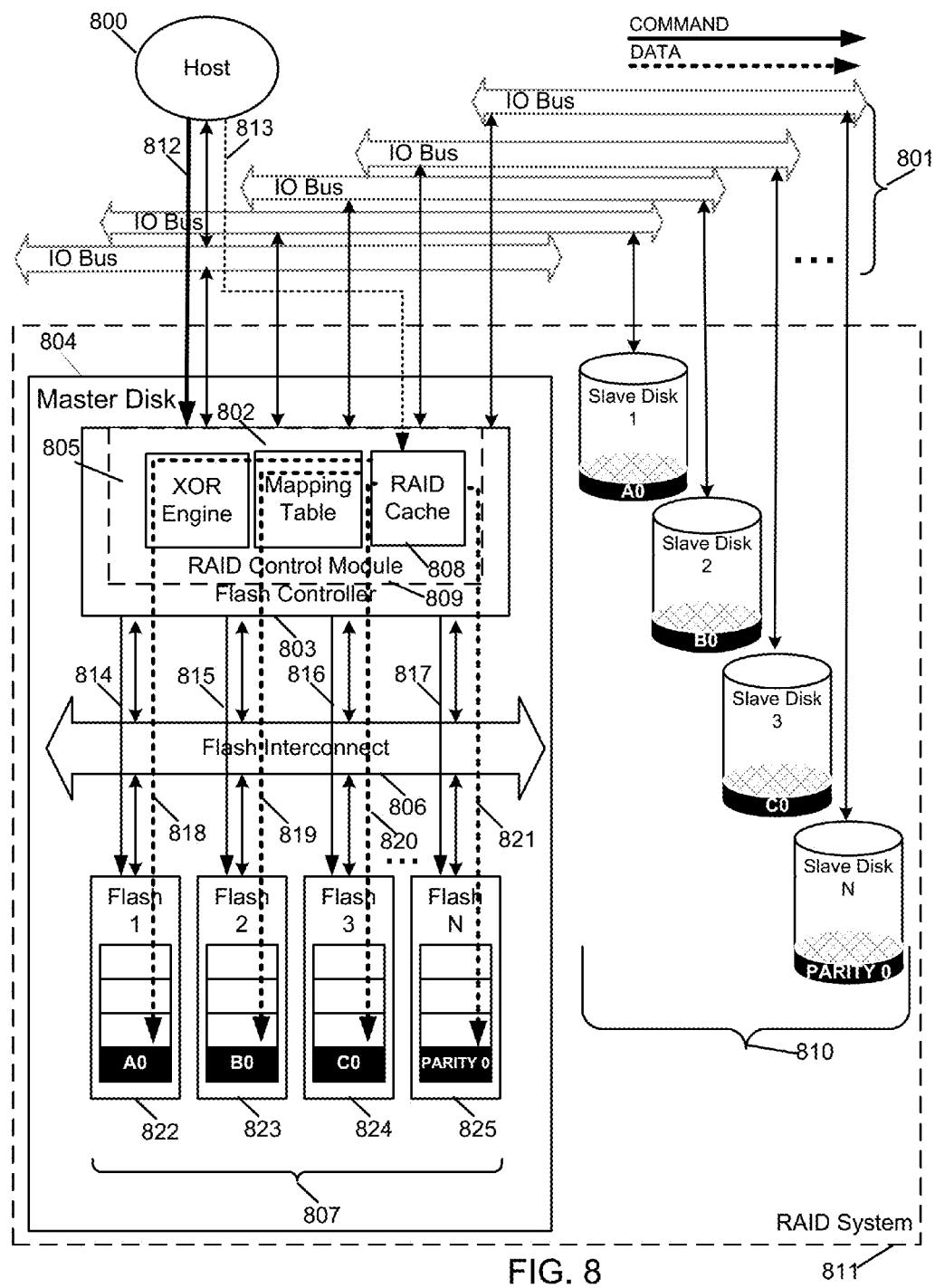
FIG. 8 is the write operation implementation in a Flash Electronic Disk taking a master role in a RAID-5 system according to an embodiment of the present invention.

FIG. 8 is the write operation implementation in a Flash Electronic Disk taking a master role in a RAID-5 system according to an embodiment of the present invention. The Master Disk 804 receives a write command 812 from the Host 800. The write data 813 is stored in the RAID Cache 808 of the RAID Control Module 809. The RAID Control Module after referring to its Mapping Table 802 determines that the write data in the RAID Cache 808 should be striped across the plurality of slave disks 810. The RAID Control Module translates the write request received from the Host 800 into multiple write accesses to the plurality of slave disks by converting the write data 813 into data stripes. The RAID Control Module also generates the corresponding parity stripe by XORing all the data stripes using its XOR Engine 805. This parity stripe is temporarily stored in the RAID Cache 808 along with the data stripes.

However, instead of accessing the slave disks frequently, the Master Disk 804 decides to first write the data stripes to its Flash Memory Devices 807. The Flash Memory Devices 807, being the system cache, contains the recently used information for the RAID system 811. The Flash Controller 803 therefore issues a flash write command 814 to write data stripe 0 818 to Flash Memory Device 1 822, a flash write command 815 to write data stripe 1 819 to Flash Memory Device 1 823 and a flash write command 816 to write data stripe 2 820 to Flash Memory Device 1 824. The Flash Controller also issues a flash write command 817 to write the parity stripe 821 to Flash Memory Device N 825. The data and parity stripes stored in the plurality of Flash Memory Devices 807 are periodically flushed to the plurality of Slave Disks 810.

Figure 9:
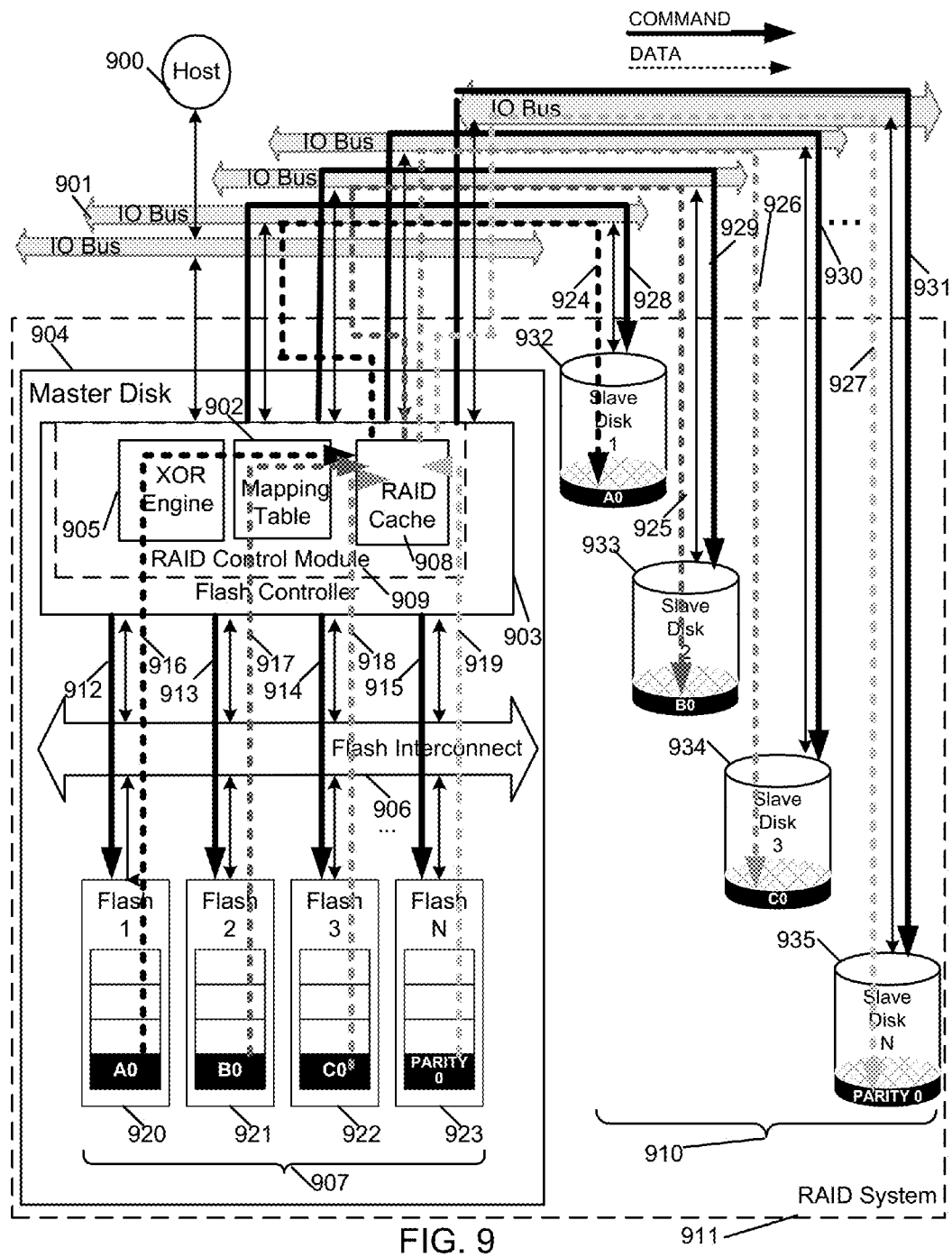
FIG. 9 illustrates how the Flash Electronic Disk performs the flushing process according to an embodiment of the present invention.

FIG. 9 illustrates how the Flash Electronic Disk performs the flushing process according to an embodiment of the present invention. The plurality of the Flash Memory Devices 907 acts as the system cache of the RAID system 911. The contents of the Flash Memory Devices are regularly transferred to the Slave Disks. Flash Memory Device 1 920 is the cache of the Slave Disk 1 932. Flash Memory Device 2 921 is the cache of the Slave Disk 2 933. Flash Memory Device 3 922 is the cache of the Slave Disk 3 934. Flash Memory Device N 923 is the cache of the Slave Disk N 935. During flushing, the Flash Controller 903 issues a flash read command 912 to Flash Memory Device 1 920 to transfer the data block 0 916 to the RAID Cache 908. The Flash Controller then issues an IO write command 928 to Slave Disk 1 932 to transfer the same data block 0 924 from RAID Cache 908 to Slave Disk 1 932. In the same way, the Flash Controller 903 issues a flash read command 913 to Flash Memory Device 2 921 to transfer the data block 1 917 to the RAID Cache 908. The Flash Controller then issues an IO write command 929 to Slave Disk 2 933 to transfer the same data block 1 925 from RAID Cache 908 to Slave Disk 2 933. For Flash Memory Device 3 922, the Flash Controller 903 issues a flash read command 914 to Flash Memory Device 3 922 to transfer the data block 2 918 to the RAID Cache 908. The Flash Controller then issues an IO write command 930 to Slave Disk 3 934 to transfer the same data block 2 926 from RAID Cache 908 to Slave Disk 3 934. And lastly for Flash Memory Device N 923, the Flash Controller 903 issues a flash read command 915 to Flash Memory Device N 923 to transfer the data block N-1 919 to the RAID Cache 908. The Flash Controller then issues an IO write command 931 to Slave Disk N 935 to transfer the same data block N-1 927 from RAID Cache 908 to Slave Disk N 935.

Figure 10:
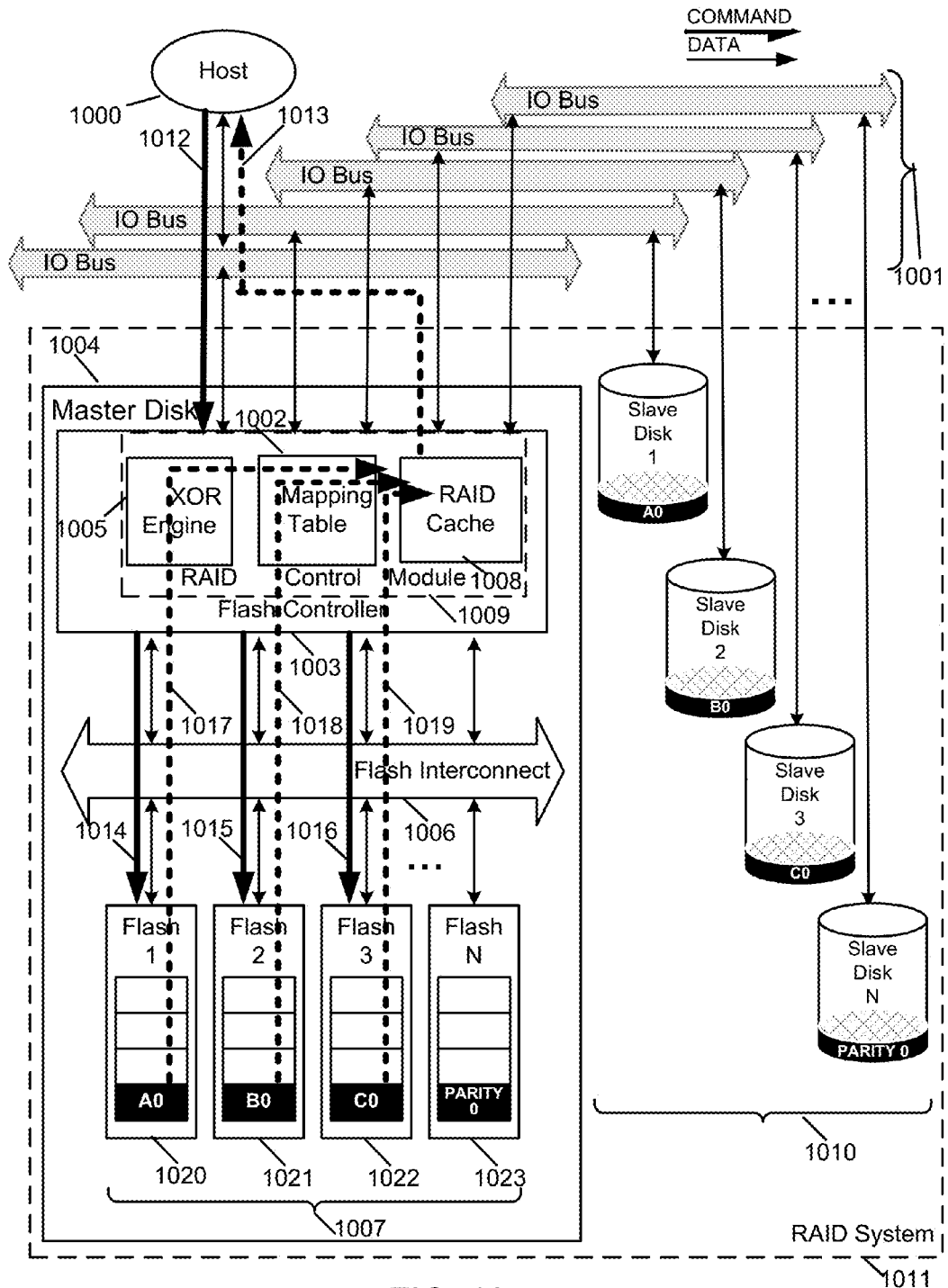
FIG. 10 is the read operation implementation in a Flash Electronic Disk taking a master role in a RAID-5 system according to an embodiment of the present invention.

FIG. 10 is the read operation implementation in a Flash Electronic Disk taking a master role in a RAID-5 system according to an embodiment of the present invention. Host 1000 issues a read command 1012 to the Master Disk 1004. The RAID Control Module 1009 determines that the requested data is striped across the plurality of slave disks 1010. The RAID Control Module translates the read request received from the Host 1000 into multiple read accesses to the plurality of slave disks by reading the corresponding data stripes. The RAID Control Module 1009 of the Master Disk checks its Mapping Table 1002 to determine from which slave disks 1010 the data stripes will come from.

However, instead of accessing the slave disks frequently, the Master Disk 1004 in one embodiment can decide to read the data stripes from its Flash Memory Devices 1007. The Flash Memory Devices 1007, being the system cache, contains the recently accessed information for the RAID system 1011. The Flash Controller 1003 therefore issues a flash read command 1014 to Flash Memory Device 1 1020 to get data stripe 1017, a flash read command 1015 to Flash Memory Device 2 1021 to get data stripe 1018 and a flash read command 1016 to Flash Memory Device 3 1022 to get data stripe 1019. These data stripes are stored and reconstructed in RAID Cache 1008 before being sent to the Host 1000 as the read data 1013.

Figure 11:
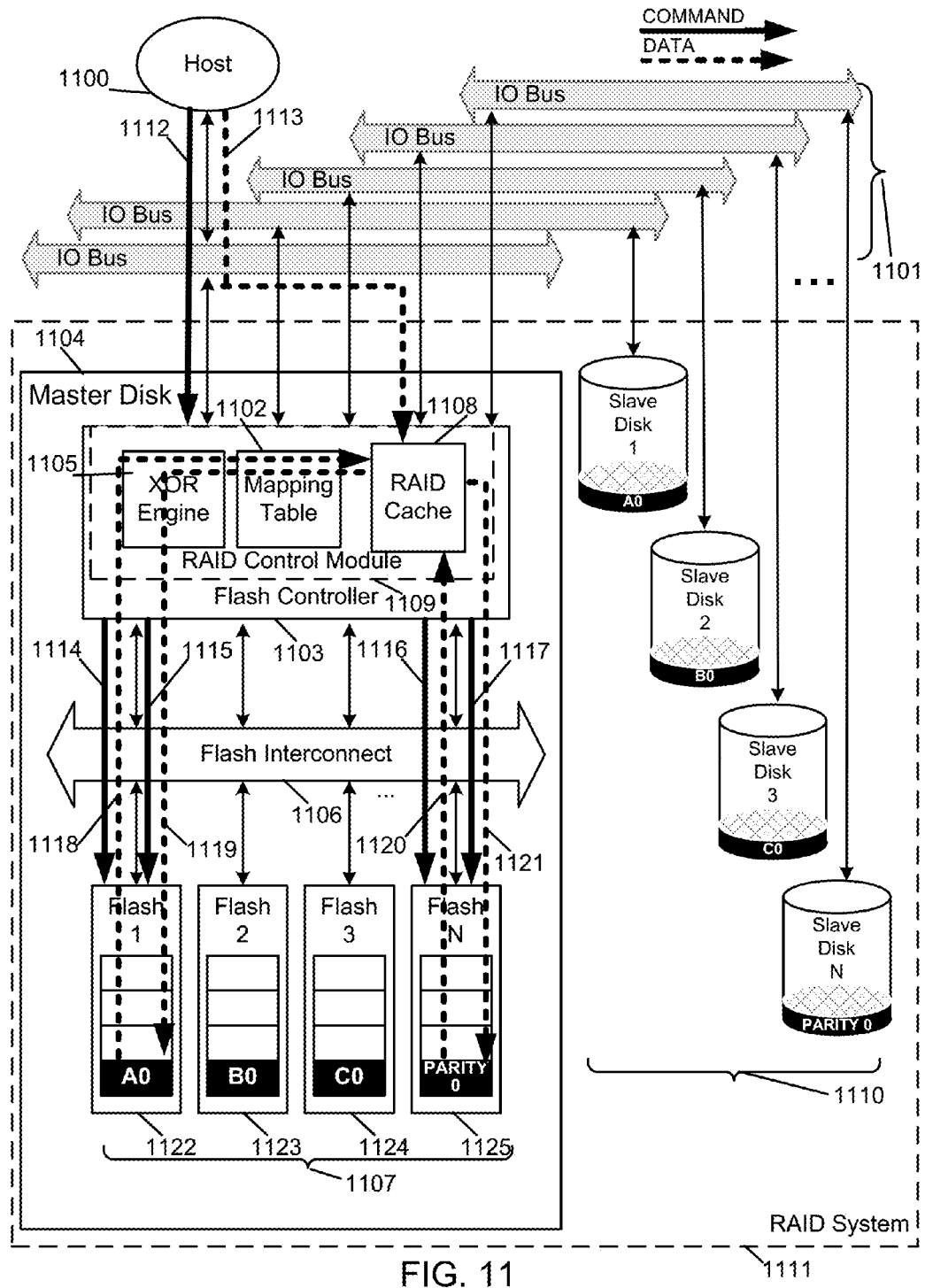
FIG. 11 is the read-modify-write operation implementation in a Flash Electronic Disk taking a master role in a RAID-5 system according to an embodiment of the present invention.

FIG. 11 is the read-modify-write operation implementation in a Flash Electronic Disk taking a master role in a RAID-5 system according to an embodiment of the present invention. Host 1100 sends a write command 1112 to the Master Disk 1104. The RAID Control Module 1109 of the Master Disk receives the write data 1113 and stores it in the RAID Cache 1108. After referring to the Mapping Table 1102, the RAID Control Module discovers that the write request involves a write of only a data stripe. A write of only a data stripe involves a read-modify-write operation. The RAID Control Module first checks from which slave disks will the old data stripe and old parity stripe come from. The RAID Control Module determines that the old data stripe should come from Slave Disk 1 and the old parity stripe should come from Slave Disk N.

However, instead of accessing the slave disks frequently, the Master Disk 1104 decides to read these stripes from its Flash Memory Devices 1107. The Flash Memory Devices 1107, being the system cache, contains the recently accessed information for the RAID system 1111. The Flash Controller 1103 therefore issues a flash read command 1114 to the Flash Memory Device 1 1122 to read the old data stripe 1118. The old data stripe 1118 is XORed with the new data stripe 1113 stored in the RAID Cache 1108 using the XOR Engine 1105. The result of the XOR operation is temporarily stored in the RAID Cache 1108. The new data stripe is still kept in the RAID Cache. The Flash Controller then issues a flash read command 1116 to the Flash Memory Device N 1125 to read the old parity 1120. The old parity 1120 is then XORed with the result of the previous XOR operation using the XOR Engine 1105. The result of this XOR operation, the new parity, is again stored in the RAID Cache 1108. After generating the new parity, the Flash Controller 1103 issues a flash write command 1115 to the Flash Memory Device 1 1122 to write the new data stripe 1119 from the RAID Cache 1108. The Flash Controller also issues a flash write command 1117 to the Flash Memory Device N 1125 to write the new parity 1121.

Figure 12:
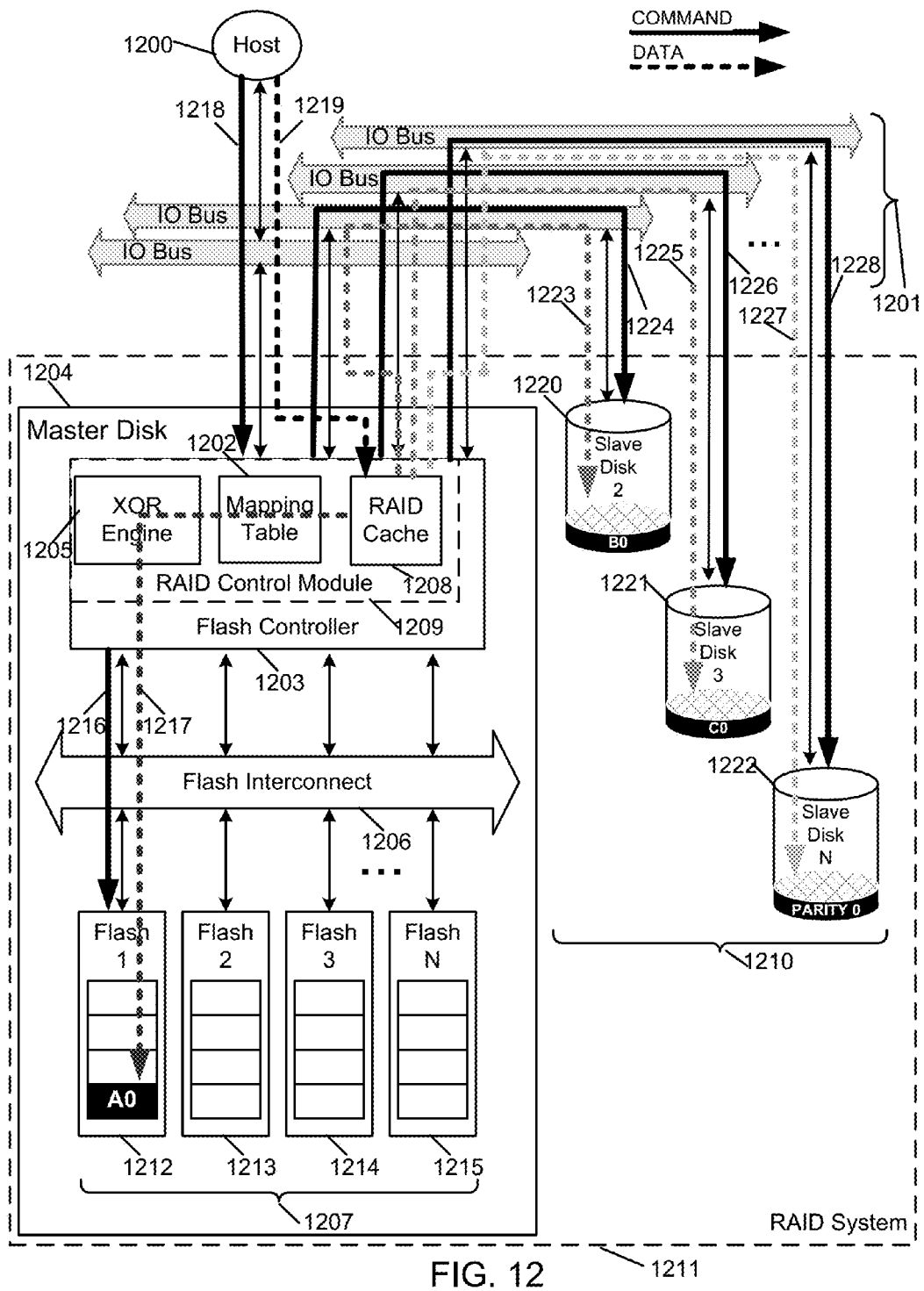
FIG. 12 is the write operation implementation in a Flash Electronic Disk taking dual roles in a RAID-5 system according to an embodiment of the present invention.

FIG. 12 is the write operation implementation in a Flash Electronic Disk taking dual roles in a RAID-5 system according to an embodiment of the present invention. In this implementation, the RAID Control Module 1209 of the Master Disk 1204 is configured as the RAID Controller of the RAID system 1211. The Flash Memory Device 1 1212 of the Master Disk, along with the Slave Disks 1220, 1221, 1222 act as the RAID Slave Disks with the data striped across all the slave disks.

The Flash Controller 1203 of the Master Disk 1204 receives a write command 1218 along with the write data 1219 from the Host 1200. The Flash Controller stores the write data 1219 it received from the Host 1200 in the RAID Cache 1208. Based from the Mapping Table 1202 of the RAID Control Module 1209, the data sent by the Host 1200 should be striped across all the RAID Slave Disks. The RAID Control Module translates the write request received from the Host 1200 into multiple write accesses by converting the write data 1219 into data stripes. The RAID Control Module also generates the corresponding parity stripe by XORing all the data stripes using its XOR Engine 1205. This parity stripe is temporarily stored in the RAID Cache 1208 along with the data stripes. The Flash Controller 1203 then issues a flash write command 1216 to write data stripe 0 1217 to Flash Memory Device 1 1212, an IO write command 1224 to write data stripe 1 1223 to Slave Disk 2 1220 and an IO write command 1226 to write data stripe 2 1225 to Slave Disk 3 1221. The Flash Controller also issues an IO write command 1228 to write the parity stripe 1227 to Slave Disk N 1222.

Figure 13:
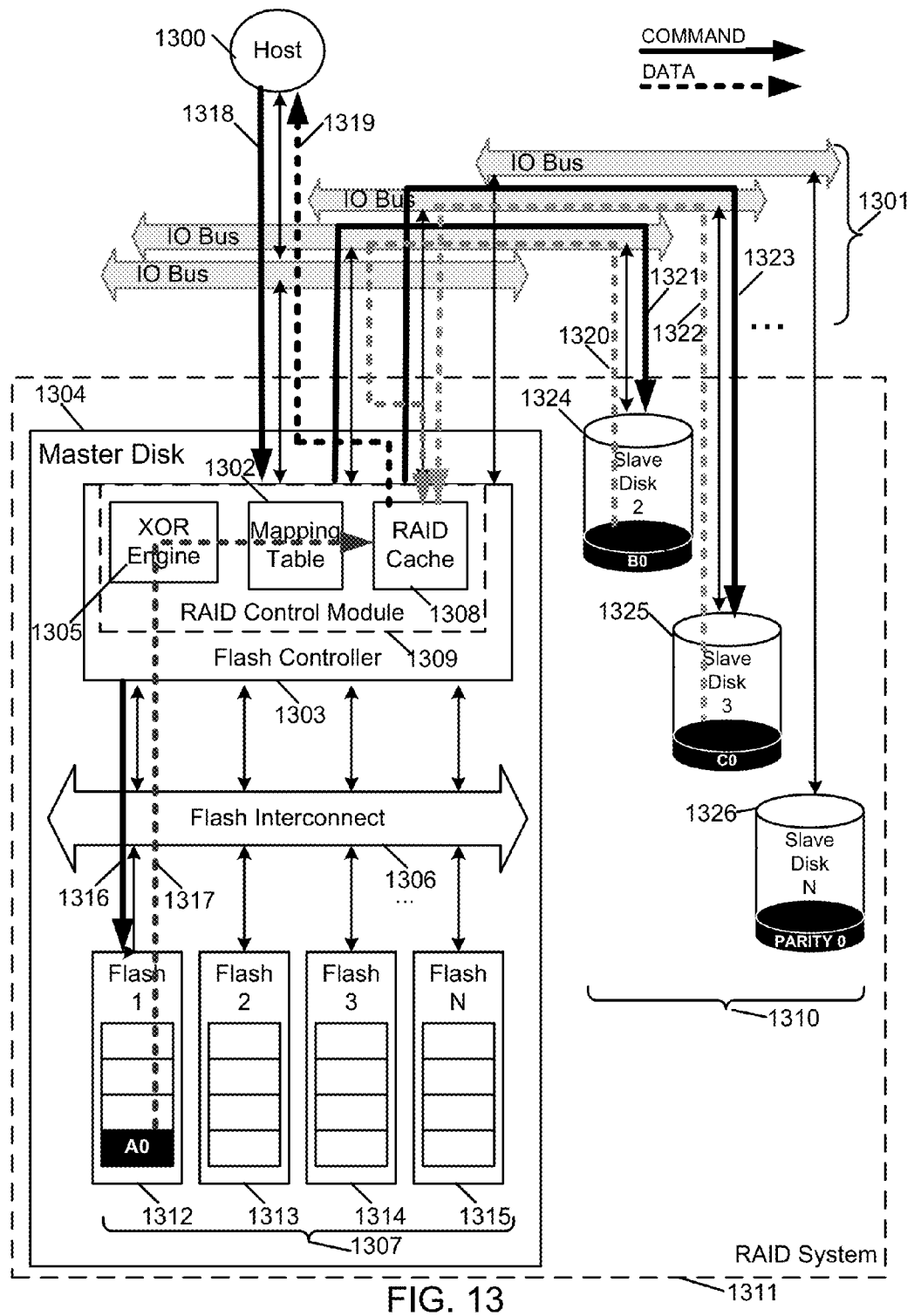
FIG. 13 is the read operation implementation in a Flash Electronic Disk taking dual roles in a RAID-5 system according to an embodiment of the present invention.

FIG. 13 is the read operation implementation in a Flash Electronic Disk taking dual roles in a RAID-5 system according to an embodiment of the present invention. In this implementation, the RAID Control Module 1309 of the Master Disk 1304 is configured as the RAID Controller of the RAID system 1311. The Flash Memory Device 1 1312 of the Master Disk, along with the Slave Disks 1324, 1325, 1326 act as the RAID Slave Disks with the data striped across all the slave disks.

The Flash Controller 1303 of the Master Disk 1304 receives a read command 1318 from the Host 1300. The RAID Control Module 1309 being the RAID Controller of the RAID system 1311 interprets the command by referring to its Mapping Table 1302. Based from the Mapping Table, the data being requested by the Host 1300 is found to be striped across all the RAID Slave Disks. The Flash Controller then creates the corresponding Flash Read command for the Flash Memory Device and IO Read commands for the other Slave Disks. A Flash Read command 1316 is sent to Flash Memory Device 1 1312 to get the data stripe 0 1317. An IO Read command 1321 is sent to Slave Disk 2 1324 to get the data stripe 1 1320. An IO Read command 1323 is sent to Slave Disk 3 1325 to get the data stripe 2 1322. The data stripes received from the Flash Memory Device and the Slave Disks are reconstructed in the RAID Cache 1308 and then sent to the requesting Host 1300 as the read data 1319.

Figure 14:
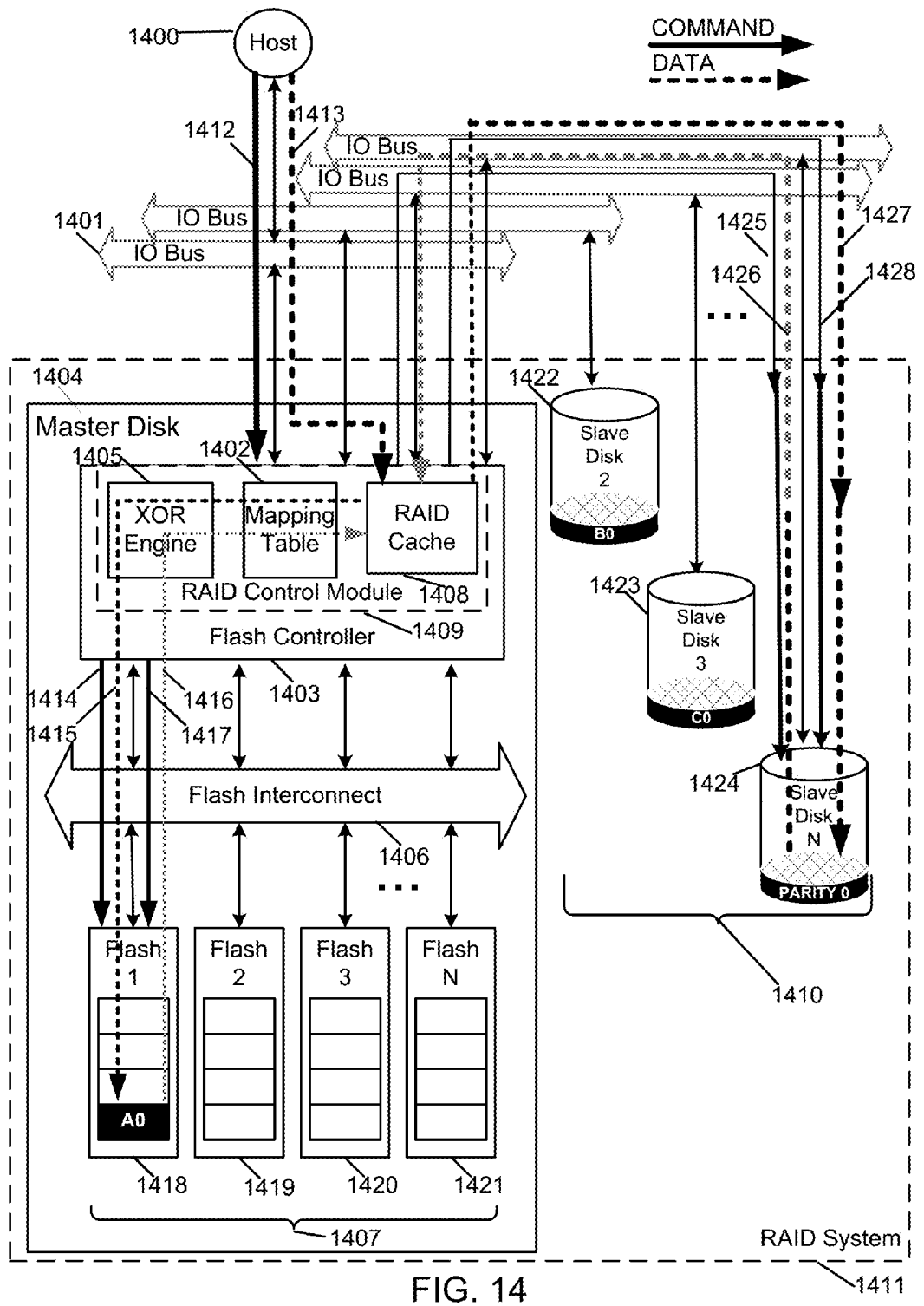
FIG. 14 is the read-modify-write operation implementation in a Flash Electronic Disk taking dual roles in a RAID-5 system according to an embodiment of the present invention.

FIG. 14 is the read-modify-write operation implementation in a Flash Electronic Disk taking dual roles in a RAID-5 system according to an embodiment of the present invention. In this implementation, the RAID Control Module 1409 of the Master Disk 1404 is configured as the RAID Controller of the RAID system 1411. The Flash Memory Device 1 1418 of the Master Disk, along with the Slave Disks 1422, 1423, 1424 act as the RAID Slave Disks with the data striped across all the slave disks.

Host 1400 sends a write command 1412 to the Master Disk 1404. The RAID Control Module 1409 of the Master Disk receives the write data 1413 and stores it in the RAID Cache 1408. After referring to the Mapping Table 1402, the RAID Control Module discovers that the write request involves a write of only a data stripe. A write of only a data stripe involves a read-modify-write operation. The RAID Control Module first checks from which slave disks will the old data stripe and old parity stripe come from. The RAID Control Module determines that the old data stripe should come from Flash Memory Device 1 and the old parity stripe should come from Slave Disk N.

The Flash Controller 1403 issues a flash read command 1417 to the Flash Memory Device 1 1418 to read the old data stripe 1416. The old data stripe 1416 is XORed with the new data stripe 1413 stored in the RAID Cache 1408 using the XOR Engine 1405. The result of the XOR operation is temporarily stored in the RAID Cache 1408. The new data stripe is still kept in the RAID Cache. The Flash Controller then issues an IO read command 1425 to the Slave Disk N 1424 to read the old parity 1426. The old parity 1426 is then XORed with the result of the previous XOR operation using the XOR Engine 1405. The result of this XOR operation, the new parity, is again stored in the RAID Cache 1408. After generating the new parity, the Flash Controller 1403 issues a flash write command 1414 to the Flash Memory Device 1 1418 to write the new data stripe 1415 from the RAID Cache 1408. The Flash Controller also issues an IO write command 1428 to the Slave Disk N 1424 to write the new parity 1427.

Figure 15:
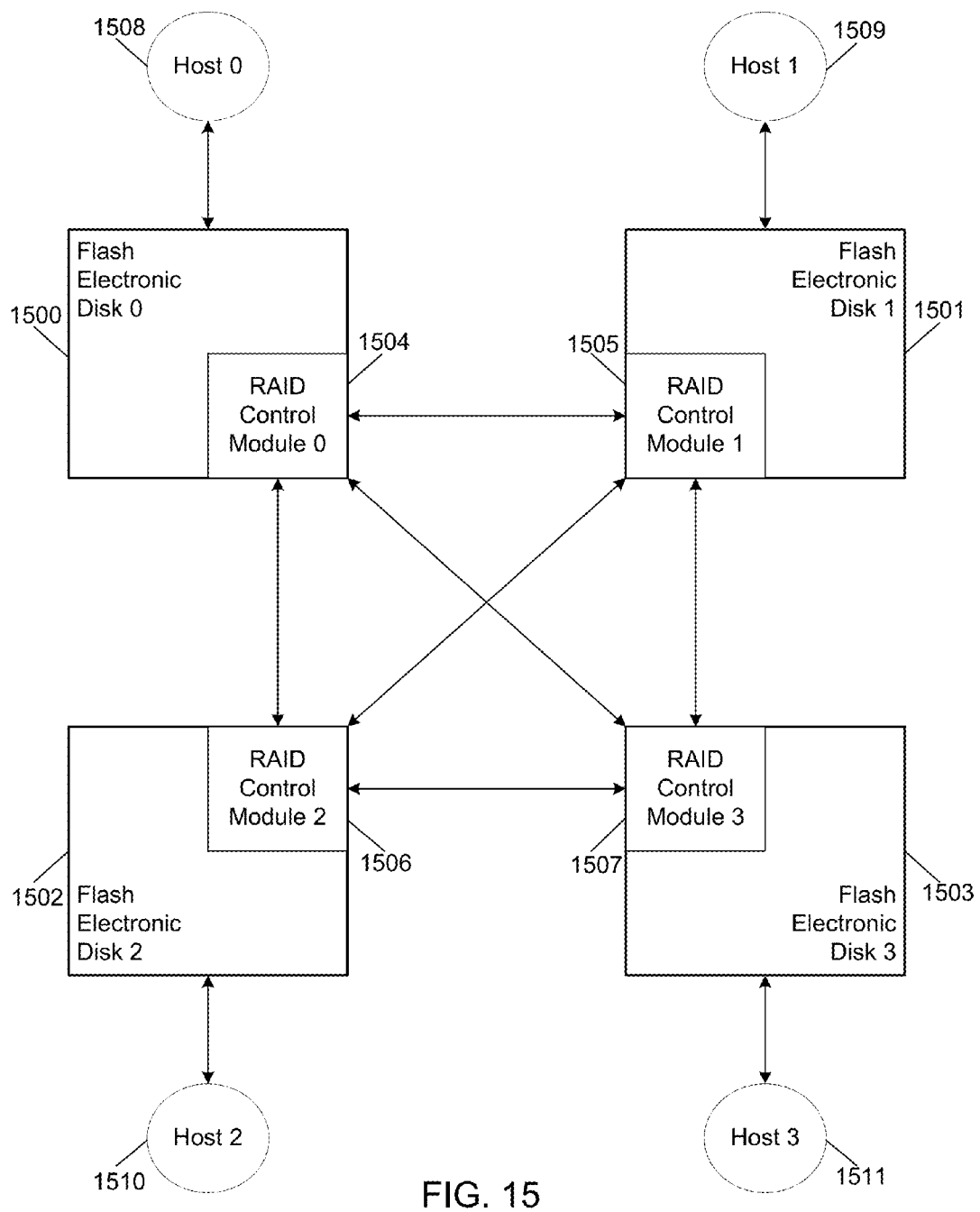
FIG. 15 is a possible configuration of four Flash Electronic Disks in a RAID System according to an embodiment of the present invention.

FIG. 15 is a configuration of four Flash Electronic Disks in a RAID System according to an embodiment of the present invention. Each of the four Flash Electronic Disks 1500, 1501, 1502 and 1503 has a RAID Control Module 1504, 1505, 1506 and 1507. All other disk modules are hidden, as the focus is on the role of the RAID Control Modules. The Flash Electronic Disks are interconnected via the one or more generic IO Interface. If the Flash Memory Devices in each Flash Electronic Disk are partitioned in such a way that it allows multiple RAID systems to access it, each Flash Electronic Disk can participate in multiple RAID systems and take on dual roles—RAID Master or Slave Disk. For example, Host 0 1508 configures Flash Electronic Disk 0 1500 to become a RAID Controller with Flash Electronic Disk 1 1501, Flash Electronic Disk 2 1502 and Flash Electronic Disk 3 1503 as its slave disks. For clarity, the RAID system defined by Host 0 1508 is labeled as RAID System 0. Under RAID System 0, the RAID Control Modules 1505, 1506, and 1507 take on the Slave mode. In RAID System 1, Host 1509 configures the RAID Control Module 1505 to take the Master role while RAID Control Modules 1504, 1506 and 1507 take slave roles. The same goes for RAID System 2 which has 1510 as the Host and RAID Control Module 1506 as its Master, and RAID System 3 which has 1511 as the Host and 1507 as the RAID Control Module. FIG. 15 shows a possible configuration of Flash Electronic Disks in one embodiment employing the invention used to its full potential in RAID systems. It shows 4 computer systems using four Flash Electronic Disks in four distinct RAID Systems 0, 1, 2 and 3.

FIG. 16. summarizes the multi-RAID configuration of multiple Flash Electronic Disks according to an embodiment of the present invention. Column 1602 lists the Flash Electronic Disks 0, 1, 2, 3, and N respectively in rows 1620, 1622, 1624, 1626, and 1628. Columns 1604, 1606, 1608, 1610, and 1612 list the Raid System 0, 1, 2, 3, and N, respectively. More Flash Electronic Disks can be added to the configuration of FIG. 15 to produce multiple RAID systems on a plurality of disks. The RAID system becomes more stable and data integrity is high. The configuration also allows non flash electronic disks to be inserted into the RAID system, as long as it conforms to the IO Interface, but its role will be limited only to being a slave, and its address map is limited only to the RAID system where its RAID Controller is attached to.

Figure 17:
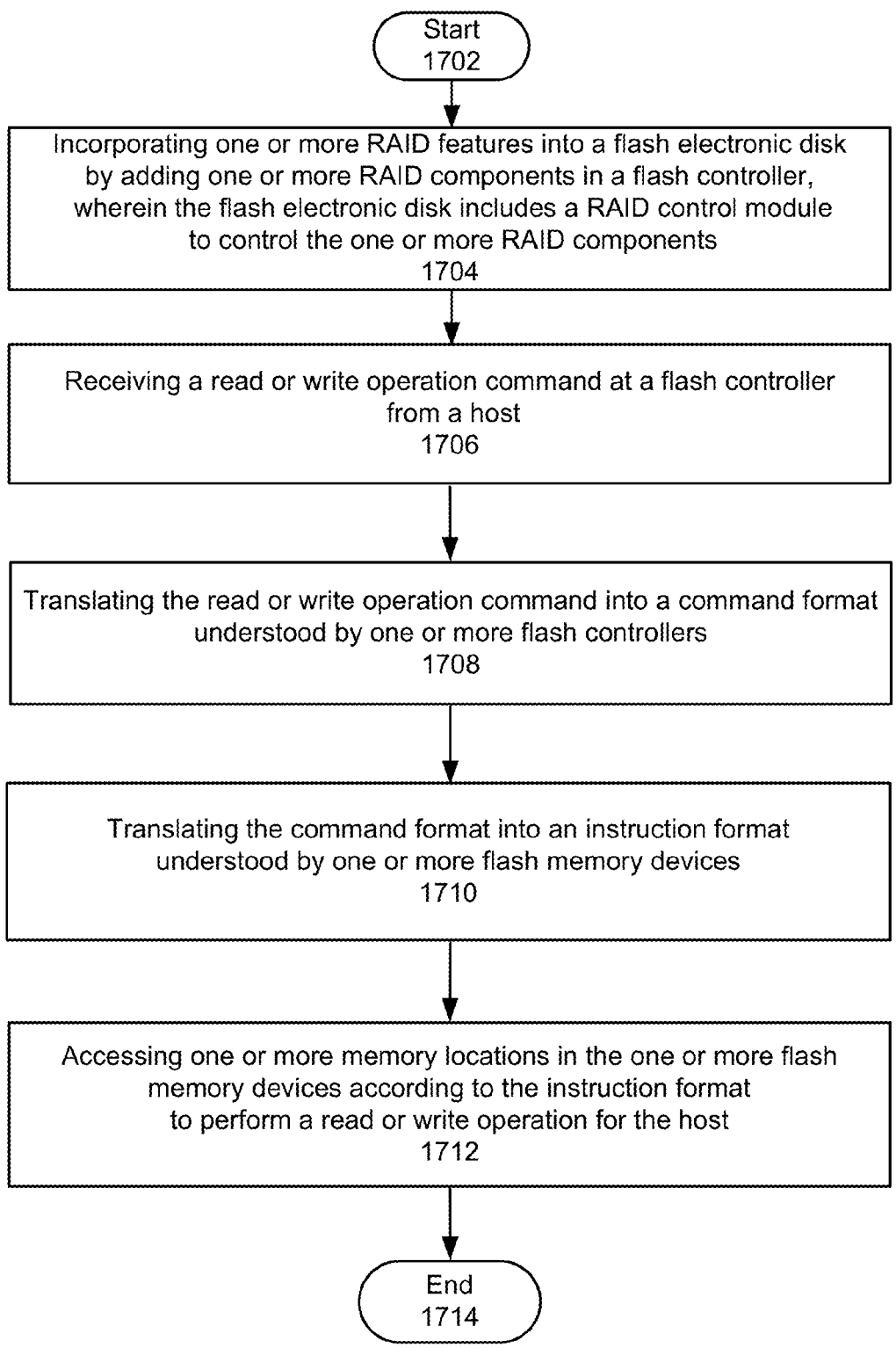
FIG. 17 illustrates a method to operationally integrate one or more RAID control mechanisms into a flash electronic disk controller, in accordance with one embodiment of the invention.

FIG. 17 illustrates a method to operationally integrate one or more RAID control mechanisms into a flash electronic disk controller, in accordance with one embodiment of the invention. The method starts in operation 1702. Operation 1704 is next and includes incorporating one or more RAID features into a flash electronic disk by adding one or more RAID components in a flash controller, wherein the flash electronic disk is upgraded with the addition of a RAID control module to control the one or more RAID components. Operation 1706 is next and includes receiving a read or write operation command at the flash electronic disk controller from a host. Operation 1708 is next and includes translating the read or write operation command into a command format understood by one or more flash controllers. Operation 1710 is next and includes translating the command format into an instruction format understood by one or more flash memory devices. Operation 1712 is next and includes accessing one or more memory locations in the one or more flash memory devices according to the instruction format to perform a read or write operation for the host. The method ends in operation 1714.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
an IO (Input/Output) bus;
a host coupled to the IO bus;
a flash electronic disk coupled via the IO bus to the host, wherein the flash electronic disk incorporates one or more RAID features, said flash electronic disk comprising a flash controller having one or more RAID components, wherein the flash electronic disk includes a RAID control module to control the one or more RAID components, wherein the flash controller receives a read operation command or write operation command from the host and translates the read operation command or write operation command into a command format that can be understood by one or more flash memory devices;
wherein the flash electronic disk further comprises one or more flash memory devices and a flash interconnect coupled to the flash controller and to the one or more flash memory devices;
wherein the flash controller is configured to translate the command format into an instruction format that can be understood by the one or more flash memory devices;
wherein the one or more flash memory devices include one or more memory locations that can be accessed according to the instruction format to perform a read operation or write operation for the host;
wherein the flash interconnect is configured to handle data transmission between the host and the one or more flash memory devices;
wherein the flash memory devices comprise at least a first flash memory device, a second flash memory device, and a third flash memory device;
wherein the RAID control module in the flash controller is configured to distribute data from the host across the flash memory devices by data striping;
wherein the RAID control module distributes a first data stripe of the data into the first flash memory device, distributes a second data stripe of the data into the second flash memory device, and distributes a parity of the data into the third flash memory device;
wherein the flash controller is coupled to the IC bus;
a plurality of disks coupled to the IC bus, wherein the plurality of disks comprises a first disk, a second disk, and a third disk;
wherein the flash controller transfers the first data stripe in the first flash memory device to the first disk;
wherein the flash controller transfers the second data stripe in the second flash memory device to the second disk; and
wherein the flash controller transfers the parity of the data in the third flash memory device to the third disk.

2. The apparatus of claim 1, wherein:
the RAID control module comprises a RAID cache that serves as a temporary data storage during one or more parity calculations.

3. The apparatus of claim 1, wherein:
the RAID control module comprises a mapping table for address translation of the read operation and write operation commands received from the host.

4. The apparatus of claim 1, wherein:
the RAID control module comprises an XOR engine that is used during one or more parity calculations.

5. The apparatus of claim 1, wherein:
the RAID control module comprises an XOR engine that is used during one or more parity calculations, a RAID cache that serves as a temporary data storage during one or more parity calculations and a mapping table for address translation of the read operation and write operation commands received from the host.

6. The apparatus of claim 1, wherein the one or more flash memory devices are used as a slave disk instead of a cache memory.

7. The apparatus of claim 1, wherein the one or more flash memory devices are used as a slave disk instead of a cache memory by remapping a plurality of memory locations of the one or more flash memory devices on a new addressing scheme kept by the RAID control module in a mapping table.

8. The apparatus of claim 1, wherein the one or more flash memory devices are distributed to a number of RAID systems, wherein the flash electronic disk has one or more flash memory devices assigned to the RAID control module, and a remainder of the flash memory devices are assigned to another RAID control module in another RAID system.

9. The apparatus of claim 1, wherein the one or more flash memory devices are used as hot spare replacement disks.

10. The apparatus of claim 1, wherein the one or more flash memory devices are used as hot spare replacement disks, wherein one or more replacement disks allow the RAID control module to perform reconstruction to regenerate data from a failed disk by reading the data from one or more surviving slave disks.

11. A method comprising:
incorporating one or more RAID features into a flash electronic disk by adding one or more RAID components in a flash controller, wherein the flash electronic disk includes a RAID control module to control the one or more RAID components;
receiving a read operation command or write operation command at the flash electronic disk from a host;
translating the read operation command or write operation command into a command format understood by one or more flash memory devices;
translating the command format into an instruction format understood by one or more flash memory devices;
handling, by a flash interconnect coupled to the flash controller and to the one or more flash memory devices, data transmission between the host and the one or more flash memory devices;
accessing one or more memory locations in the one or more flash memory devices according to the instruction format to perform a read operation or write operation for the host;
distributing, by the RAID control module in the flash controller, data from the host across the one or more flash memory devices by data striping;
wherein the one or more flash memory devices comprise at least a first flash memory device, a second flash memory device, and a third flash memory device;
wherein the RAID control module distributes a first data stripe of the data into the first flash memory device, distributes a second data stripe of the data into the second flash memory device, and distributes a parity of the data into the third flash memory device;
wherein the host and the flash controller are both coupled to an IC (input/output) bus;
wherein a plurality of disks is coupled to the IC bus, wherein the plurality of disks comprises a first disk, a second disk, and a third disk;
transferring, by the flash controller, the first data stripe in the first flash memory device to the first disk;
transferring, by the flash controller, the second data stripe in the second flash memory device to the second disk; and
transferring, by the flash controller, the parity of the data in the third flash memory device to the third disk.

12. The method of claim 11, wherein incorporating the one or more RAID features into the flash electronic disk includes adding the RAID control module having a RAID cache that serves as a temporary data storage during one or more parity calculations.

13. The method of claim 11, wherein incorporating the one or more RAID features into the flash electronic disk includes adding a mapping table for address translation of one or more read operation commands or write operation commands received from the host.

14. The method of claim 11, wherein incorporating the one or more RAID features into the flash electronic disk includes adding the RAID control module having an XOR engine that is used during one or more parity calculations.

15. The method of claim 11, wherein incorporating the one or more RAID features into the flash electronic disk includes adding the RAID control module having an XOR engine that is used during one or more parity calculations, adding a RAID cache that serves as a temporary data storage during the one or more parity calculations and adding a mapping table for address translation of the read operation or write operation commands received from the host.

16. The method of claim 11, wherein the one or more flash memory devices are used as a slave disk instead of a cache memory.

17. The method of claim 11, wherein the one or more flash memory devices are used as a slave disk instead of a cache memory and a plurality of memory locations of the flash memory devices are remapped on a new addressing scheme kept by the RAID control module in a mapping table.

18. The method of claim 11, wherein the one or more flash memory devices are used as a slave disk instead of a cache memory and a plurality of memory locations of the flash memory devices are remapped on a new addressing scheme kept by the RAID control module in a mapping table, and the one or more flash memory devices are distributed among one or more other RAID systems by assignment to one or more RAID controllers for the one or more other RAID systems.

19. The method of claim 11, wherein the one or more flash memory devices are used as hot spare replacement disks, wherein one or more replacement disks allow the RAID control module to perform reconstruction to regenerate data from a failed disk by reading the data from one or more surviving slave disks.

20. A method comprising:
incorporating one or more RAID features into a flash electronic disk by adding one or more RAID components in a flash controller, wherein the flash electronic disk includes a RAID control module to control the one or more RAID components, including adding the RAID control module having an XOR engine that is used during one or more parity calculations, adding a RAID cache that serves as a temporary data storage during the one or more parity calculations and adding a mapping table for address translation of one or more commands received from a host;
receiving a read operation command or write operation command at the flash electronic disk from the host;
translating the read operation command or write operation command into a command format understood by one or more flash memory devices;
translating the command format into an instruction format understood by one or more flash memory devices;
handling, by a flash interconnect coupled to the flash controller and to the one or more flash memory devices, data transmission between the host and the one or more flash memory devices;

accessing one or more memory locations in the one or more flash memory devices according to the instruction format to perform a read operation or write operation for the host;
distributing, by the RAID control module in the flash controller, data from the host across the one or more flash memory devices by data striping;
wherein the one or more flash memory devices comprise at least a first flash memory device, a second flash memory device, and a third flash memory device;
wherein the RAID control module distributes a first data stripe of the data into the first flash memory device, distributes a second data stripe of the data into the second flash memory device, and distributes a parity of the data into the third flash memory device;
wherein the host and the flash controller are both coupled to an IC (input/output) bus;
wherein a plurality of disks is coupled to the IC bus, wherein the plurality of disks comprises a first disk, a second disk, and a third disk;
transferring, by the flash controller, the first data stripe in the first flash memory device to the first disk;
transferring, by the flash controller, the second data stripe in the second flash memory device to the second disk; and
transferring, by the flash controller, the parity of the data in the third flash memory device to the third disk.

21. An apparatus comprising:
a flash electronic disk comprising:
  a flash controller, wherein the flash controller includes a RAID controller;
  a plurality of flash memory devices; and
  a flash interconnect coupled to the flash controller and to the plurality of flash memory devices;
wherein the flash electronic disk receives write and read commands from a host;
wherein the flash controller is configured to translate the write and read commands into flash native commands which are understood by the plurality of flash memory devices;
wherein the flash interconnect is configured to handle data transmission between the host and the plurality of flash memory devices;
wherein the plurality of flash memory devices comprises at least a first flash memory device, a second flash memory device, and a third flash memory device;
wherein the RAID controller in the flash controller is configured to distribute data from the host across the plurality of flash memory devices by data striping;
wherein the RAID controller distributes a first data stripe of the data into the first flash memory device, distributes a second data stripe of the data into the second flash memory device, and distributes a parity of the data into the third flash memory device;
wherein the flash controller and the host are both coupled to an IC (input/output) bus;
wherein a plurality of disks is coupled to the IO bus, wherein the plurality of disks comprises a first disk, a second disk, and a third disk;
wherein the flash controller transfers the first data stripe in the first flash memory device to the first disk;
wherein the flash controller transfers the second data stripe in the second flash memory device to the second disk; and
wherein the flash controller transfers the parity of the data in the third flash memory device to the third disk.

22. The apparatus of claim 21, wherein the RAID controller comprises an XOR engine that is used during one or more parity calculations, a RAID cache that serves as a temporary data storage during one or more parity calculations, and a mapping table for address translation of the write and read commands received from the host.

23. A method comprising:
receiving, by a flash electronic disk, write and read commands from a host;
translating, by a flash controller in the flash electronic disk, the write and read commands into flash native commands which are understood by a plurality of flash memory devices in the flash electronic disk;
handling, by a flash interconnect coupled to the flash controller and to the plurality of flash memory devices, data transmission between the host and the plurality of flash memory devices;
distributing, by a RAID controller in the flash controller, data from the host across the plurality of flash memory devices by data striping;
wherein the plurality of flash memory devices comprises at least a first flash memory device, a second flash memory device, and a third flash memory device;
wherein the RAID controller distributes a first data stripe of the data into the first flash memory device, distributes a second data stripe of the data into the second flash memory device, and distributes a parity of the data into the third flash memory device;
wherein the host and the flash controller are both coupled to an IO (input/output) bus;
wherein a plurality of disks is coupled to the IO bus, wherein the plurality of disks comprises a first disk, a second disk, and a third disk;
transferring, by the flash controller, the first data stripe in the first flash memory device to the first disk;
transferring, by the flash controller, the second data stripe in the second flash memory device to the second disk; and
transferring, by the flash controller, the parity of the data in the third flash memory device to the third disk.

24. The method of claim 23, wherein the RAID controller comprises an XOR engine that is used during one or more parity calculations, a RAID cache that serves as a temporary data storage during one or more parity calculations, and a mapping table for address translation of the write and read commands received from the host.

25. An article of manufacture, comprising:
a non-transitory computer-readable medium having stored thereon instructions operable to permit an apparatus to:
receive, by a flash electronic disk, write and read commands from a host;
translate, by a flash controller in the flash electronic disk, the write and read commands into flash native commands which are understood by a plurality of flash memory devices in the flash electronic disk;
handle, by a flash interconnect coupled to the flash controller and to the plurality of flash memory devices, data transmission between the host and the plurality of flash memory devices;
distribute, by a RAID controller in the flash controller, data from the host across the plurality of flash memory devices by data striping;

wherein the plurality of flash memory devices comprises at least a first flash memory device, a second flash memory device, and a third flash memory device;

wherein the RAID controller distributes a first data stripe of the data into the first flash memory device, distributes a second data stripe of the data into the second flash memory device, and distributes a parity of the data into the third flash memory device;

wherein the host and the flash controller are both coupled to an IO (input/output) bus;

wherein a plurality of disks is coupled to the IO bus, wherein the plurality of disks comprises a first disk, a second disk, and a third disk;

transfer, by the flash controller, the first data stripe in the first flash memory device to the first disk;

transfer, by the flash controller, the second data stripe in the second flash memory device to the second disk; and transfer, by the flash controller, the parity of the data in the third flash memory device to the third disk.

26. The article of manufacture of claim 25, wherein the RAID controller comprises an XOR engine that is used during one or more parity calculations, a RAID cache that serves as a temporary data storage during one or more parity calculations, and a mapping table for address translation of the write and read commands received from the host.

* * * * *